(12) United States Patent
Lin et al.

(10) Patent No.: US 11,711,803 B2
(45) Date of Patent: Jul. 25, 2023

(54) TIME DOMAIN RESOURCE ALLOCATION FOR DOWNLINK SHARED CHANNEL

(71) Applicant: Telefonaktiebolaget LM Ericsson (publ), Stockholm (SE)

(72) Inventors: Zhipeng Lin, Nanjing (CN); Jingya Li, Gothenburg (SE); Jung-Fu Cheng, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 455 days.

(21) Appl. No.: 16/336,087

(22) PCT Filed: Feb. 15, 2019

(86) PCT No.: PCT/CN2019/075284
§ 371 (c)(1),
(2) Date: Mar. 22, 2019

(87) PCT Pub. No.: WO2019/158125
PCT Pub. Date: Aug. 22, 2019

(65) Prior Publication Data
US 2022/0248435 A1    Aug. 4, 2022

(30) Foreign Application Priority Data

Feb. 16, 2018 (WO) ............... PCT/CN2018/076919

(51) Int. Cl.
*H04W 72/1273*    (2023.01)
*H04W 56/00*    (2009.01)
(Continued)

(52) U.S. Cl.
CPC ...... *H04W 72/1273* (2013.01); *H04W 56/001* (2013.01); *H04W 68/005* (2013.01); *H04W 72/0446* (2013.01); *H04W 72/23* (2023.01)

(58) Field of Classification Search
CPC .......... H04W 72/1273; H04W 56/001; H04W 68/005; H04W 72/042; H04W 72/0446
(Continued)

(56) References Cited

U.S. PATENT DOCUMENTS

2011/0149774 A1    6/2011    Chen et al.
2011/0176461 A1    7/2011    Astely et al.
(Continued)

FOREIGN PATENT DOCUMENTS

CN    107404365 A    11/2017
CN    107659994 A    2/2018
(Continued)

OTHER PUBLICATIONS

Vivo. "Discussion on Remaining Minimum System Information", R1-1800174, Jan. 22-26, 2018. (From Applicant's IDS) (Year: 2018).*

(Continued)

*Primary Examiner* — Mang Hang Yeung
(74) *Attorney, Agent, or Firm* — Nicholson De Vos Webster & Elliott LLP

(57) ABSTRACT

A mechanism for time domain resource allocation for downlink shared channel, in which the time domain resource is allocated according to CORESET configurations when SS/PBCH block and RMSI CORESET are multiplexed with Type 1, Type 2 or Type 3 pattern.

18 Claims, 19 Drawing Sheets

(51) Int. Cl.
  H04W 68/00  (2009.01)
  H04W 72/0446  (2023.01)
  H04W 72/23  (2023.01)
(58) Field of Classification Search
  USPC .......................................................... 370/329
  See application file for complete search history.

(56) References Cited

U.S. PATENT DOCUMENTS

| | | | |
|---|---|---|---|
| 2016/0100422 A1* | 4/2016 | Papasakellariou | .... H04L 1/1861 370/329 |
| 2018/0042028 A1 | 2/2018 | Nam et al. | |
| 2019/0021119 A1* | 1/2019 | Ng | .................... H04W 72/0453 |
| 2019/0123992 A1* | 4/2019 | Ly | ......................... H04L 43/065 |
| 2019/0159203 A1* | 5/2019 | Kim | ...................... H04W 48/10 |
| 2019/0223163 A1* | 7/2019 | Ko | ........................ H04W 48/16 |

FOREIGN PATENT DOCUMENTS

| | | |
|---|---|---|
| GB | 2565369 A | 2/2019 |
| WO | 2018226054 A1 | 12/2018 |

OTHER PUBLICATIONS

ETRI, "Correction on RMSI CORREECT configuration", R1-1800407, Jan. 22-26, 2018. (From Applicant's IDS) (Year: 2018).*
International Search Report and Written Opinion for Application No. PCT/CN2019/075284, dated May 7, 2019, 9 pages.
Qualcomm Incorporated, "Remaining Details on DL/UL Resource Allocation," R1-1720687, 3GPP TSG-RAN WG1 Meeting #91, Reno, USA, Nov. 27-Dec. 1, 2017, 8 pages.
Samsung, "Remaining Details on RMSI," R1-1720274, 3GPP TSG RAN WG1#91, Reno, USA, Nov. 27-Dec. 1, 2017, 19 pages.
CMCC, "Discussion on Remaining Issues for Time Domain Resource Allocation," R1-1800547, 3GPP TSG RAN WG1 Meeting AH 1801, Jan. 22-26, 2018, 4 pages.
Examination Report, IN App. No. 201917008944, dated Oct. 14, 2020, 6 pages.
Supplementary European Search Report and Search Opinion, EP App. No. 19708765.3, dated Jul. 29, 2020, 12 pages.
3GPP TS 38.213 V15.0.0, "3rd Generation Partnership Project; Technical Specification Group Radio Access Network NR; Physical layer procedures for control (Release 15)," Dec. 2017, 56 pages, 3GPP Organizational Partners.
International Preliminary Report on Patentability (Chapter II), PCT App. No. PCT/CN2019/075284, dated Mar. 27, 2020, 35 pages.
AT&T, "Remaining issues in DL/UL resource allocation", Jan. 22-26, 2018, 14 pages, 3GPP TSG RAN WG1 Meeting AH 1801, R1-1800577, Vancouver, Canada.
Decision to Grant, EP App. No. 19708765.3, dated Dec. 2, 2021, 2 pages.
Decision to Grant, JP App. No. 2020-543008, dated Feb. 28, 2022, 6 pages (2 pages of English Translation and 4 pages of Office Action).
Ericsson, "DL/UL resources allocation", Feb. 26-Mar. 2, 2018, 9 pages, 3GPP TSG-RAN1#92, R1-1802910, Athens, Greece.
ETRI, "Correction on RMSI CORESET configuration", Jan. 22-26, 2018, pp. 1-4, 3GPP TSG RAN WG1 Meeting NR#4, R1-1800407, Vancouver, Canada.

European Search Report and Search Opinion, EP App. No. 21205262.5, dated Feb. 16, 2022, 11 pages.
Samsung, "Corrections on DL/UL Resource Allocation", Jan. 22-26, 2018, pp. 1-11, 3GPP TSG RAN WG1 Meeting AH1801, R1-1800451, Vancouver, Canada.
Samsung, "On Search Space Design", Oct. 9-13, 2017, pp. 1-8, 3GPP TSG RAN WG1 Meeting 90bis, R1-1717642, Prague, Czech Republic.
Vivo, "Discussion on Remaining Minimum System Information", Jan. 22-26, 2018, pp. 1-14, 3GPP TSG RAN WG1 Meeting AH 1801, R1-1800174, Vancouver, Canada.
Office Action, CA App. No. 3,090,601, dated Sep. 2, 2021, 3 pages.
Office Action, JP App. No. 2020-543008, dated Sep. 10, 2021, 34 pages (24 pages of English Translation and 10 pages of Office Action).
Second Office Action, CN App. No. 201980000461, dated Oct. 14, 2021, 14 pages (6 pages of English Translation and 8 pages of Original Document).
Grant, CN App. No. 201980000461.X, dated Jan. 14, 2022, 4 pages (2 pages of English Translation and 2 pages of Original Document).
CATT, "Working Assumptions for RMSI CORESETs", 3GPP TSG RAN WG1 Meeting 91, R1-1721726, Nov. 27-Dec. 1, 2017, 8 pages.
First Office Action, CN App. No 201980000461.X, dated May 24, 2021, 22 pages (11 pages of English Translation and 11 pages of Original Document).
LG Electronics, "RMSI delivery and CORESET configuration", 3GPP TSG RAN WG1 Meeting #91, R1-1719894, Nov. 27-Dec. 1, 2017, 15 pages.
Qualcomm Incorporated, "The necessity of reliable SR design for GF/GB UL URLLC transmission", 3GPP TSG-RAN WG1 #91, R1-1720697, Nov. 27-Dec. 1, 2017, 6 pages.
Samsung, "Summary of Offline Discussion on RMSI CORESET Configuration", 3GPP TSG RAN WG1#91, R1-1721709, Nov. 27-Dec. 1, 2017, 26 pages.
Communication under Rule 71(3) EPC, EP App. No. 19708765.3, dated Aug. 12, 2021, 142 pages.
CMCC, "Discussion on search space design for RMSI CORESET", Jan. 22-26, 2018, 4 pages. 3GPP TSG RAN WG1 Meeting AH 1801, R1-1800539, Vancouver, Canada.
Notice of Final Rejection, KR App. No. 10-2020-7023559, dated Jun. 23, 2022, 9 pages (4 pages of English Translation and 5 pages of Original Document).
Office Action, CA App. No. 3,090,601, dated May 6, 2022, 5 pages.
3GPP TS 38.211 V15.0.0, "3rd Generation Partnership Project; Technical Specification Group Radio Access Network NR; Physical channels and modulation (Release 15)," Dec. 2017, 73 pages, 3GPP Organizational Partners.
3GPP TS 38.213 V15.0.1, "3rd Generation Partnership Project; Technical Specification Group Radio Access Network; NR; Physical layer procedures for control (Release 15)," Feb. 2018, 66 pages, 3GPP Organizational Partners.
Notice of Allowance, BR App. No. 112020016549-2, dated Sep. 19, 2022, 8 pages (4 pages of English Translation and 4 pages of Original Document).
Notice of Final Rejection, KR App. No. 10-2020-7023559, dated Oct. 19, 2022, 7 pages (4 pages of English Translation and 3 pages of Original Document).

\* cited by examiner signaling time domain resources allocation for PDSCH according to RMSI CORESET configurations  S1910

TIME DOMAIN RESOURCE ALLOCATION FOR DOWNLINK SHARED CHANNEL

CROSS-REFERENCE TO RELATED APPLICATIONS

This application is a National stage of International Application No. PCT/CN2019/075284, filed Feb. 15, 2019, which claims priority to International Application No. PCT/CN2018/076919, filed Feb. 16, 2018, which are hereby incorporated by reference.

TECHNICAL FIELD

The disclosure relates to wireless communication and, in particular, to methods and apparatus for allocation of time domain resources for downlink shared channel.

BACKGROUND

In order to connect to a network, a device needs to acquire network synchronization and obtain essential system information (SI) including SI in master information block (MIB) and remaining minimum system information (RMSI). Synchronization signals are used for adjusting the frequency of the device relative to the network, and for finding proper timing of the received signal from the network. A control resource set (CORESET) is configured in MIB, which can be used to transmit PDCCH scheduling some broadcasting messages, including RMSI, other system information (OSI), paging messages and random-access response (RAR) messages.

SUMMARY

According to one embodiment, a method is implemented at a network node, wherein the network node allocates downlink shared channel in time domain at least according to Control Resource Set (CORESET) configurations.

According to another embodiment, a method is implemented at a User Equipment (UE), wherein UE determines downlink shared channel in time domain at least according to Control Resource Set (CORESET) configurations.

According to another embodiment, a method utilizes shared channel in time domain at least according to Control Resource Set (CORESET) configurations, wherein the CORESET configuration is determined by CORSET position and wherein the CORSET position is configured by PBCH.

According to another embodiment, a method of PDSCH time domain allocation provides for allocating PDSCH based on RMSI CORESET configuration.

According to another embodiment, a method for signaling for time domain allocation of PDSCH before RRC connection according to a RMSI CORESET configuration from PBCH is based on, when SS/PBCH block and RMSI CORESET are multiplexed with Type 2 pattern, signaling that PDSCH starts from a first symbol of SS/PBCH block and ends with a last symbol of SS/PBCH block.

According to another embodiment, a method for signaling for time domain allocation of PDSCH before RRC connection according to a RMSI CORESET configurations from PBCH, is based on, when SS/PBCH block and RMSI CORESET are multiplexed with Type 3 pattern, signaling that PDSCH starts immediately after a last symbol of RMSI CORESET and ends with a last symbol of SS/PBCH block.

According to another embodiment, a method for signaling for time domain allocation of PDSCH before RRC connection according to a RMSI CORESET configurations from PBCH, is disclosed for Type 1 pattern. When SS/PBCH block and RMSI CORESET are multiplexed with Type 1 pattern, if CORESET starts from a first symbol of one normal slot then for non-slot-based scheduling, signaling is based on PDSCH starting immediately after CORESET; and for slot-based scheduling, signaling is based on PDSCH starting immediately after CORESET till an end of the slot. Else, utilizing non-slot-based scheduling and signaling that PDSCH starts from a first available symbol immediately after CORESET.

According to another embodiment, a method for signaling for flexible length of PDSCH or a gap between RMSI CORSET and PDSCH.

In an aspect of the disclosure, a method implemented at a User Equipment (UE) is provided comprising determining time domain resources for downlink shared channel at least according to Control Resource Set (CORESET) configurations.

In another aspect of the disclosure, a method implemented at a User Equipment (UE) is provided comprising utilizing time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a method implemented at a network node is provided comprising allocating time domain resources for downlink shared channel at least according to Control Resource Set (CORESET) configurations.

In aspect of the disclosure, a method implemented at a network node is provided comprising utilizing time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a method implemented at a network node is provided comprising signaling time domain resources allocation for Physical Downlink Shared Channel (PDSCH) according to Remaining Minimum System Information (RMSI) Control Resource Set (CORESET) configurations.

In another aspect of the disclosure, an apparatus implemented in a User Equipment (UE) is provided comprising one or more processors and one or more memories comprising computer program codes, wherein the one or more memories and the computer program codes are configured to, with the one or more processors, cause the apparatus to determine time domain resources for downlink shared channel at least according to Control Resource Set (CORESET) configurations.

In another aspect of the disclosure, an apparatus implemented in a User Equipment (UE) is provided comprising one or more processors and one or more memories comprising computer program codes, wherein the one or more memories and the computer program codes are configured to, with the one or more processors, cause the apparatus to utilize time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, an apparatus implemented in a network node is provided comprising one or more processors, and one or more memories comprising computer program codes, wherein the one or more memories and the computer program codes are configured to, with the one or more processors, cause the apparatus to allocate time domain resources for downlink shared channel at least according to Control Resource Set (CORESET) configurations.

In another aspect of the disclosure, an apparatus implemented in a network node is provided comprising one or more processors and one or more memories comprising computer program codes, wherein the one or more memories and the computer program codes are configured to, with the one or more processors, cause the apparatus to utilize time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, an apparatus implemented in a network node is provided comprising one or more processors and one or more memories comprising computer program codes, wherein the one or more memories and the computer program codes are configured to, with the one or more processors, cause the apparatus to signal time domain resources allocation for Physical Downlink Shared Channel (PDSCH) according to Remaining Minimum System Information (RMSI) Control Resource Set (CORESET) configurations.

In another aspect of the disclosure, a computer readable medium is provided having computer program codes embodied thereon, wherein the computer program codes comprise codes for performing the methods according to above aspects of the disclosure.

In an aspect of the disclosure, an apparatus implemented in a User Equipment (UE) is provided comprising means for determining time domain resources for downlink shared channel at least according to Control Resource Set (CORESET) configurations.

In another aspect of the disclosure, an apparatus implemented in a User Equipment (UE) is provided comprising means for utilizing time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, an apparatus implemented in a network node is provided comprising means for allocating time domain resources for downlink shared channel at least according to Control Resource Set (CORESET) configurations.

In aspect of the disclosure, an apparatus implemented in a network node is provided comprising means for utilizing time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, an apparatus implemented in a network node is provided comprising means for signaling time domain resources allocation for Physical Downlink Shared Channel (PDSCH) according to Remaining Minimum System Information (RMSI) Control Resource Set (CORESET) configurations.

In another aspect of the disclosure, a base station configured to communicate with a user equipment (UE) is provided. The base station comprises a radio interface and processing circuitry configured to allocate time domain resources for downlink shared channel at least according to Control Resource Set (CORESET) configurations.

In another aspect of the disclosure, a base station configured to communicate with a user equipment (UE) is provided. The base station comprises a radio interface and processing circuitry configured to utilize time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a base station configured to communicate with a user equipment (UE) is provided. The base station comprises a radio interface and processing circuitry configured to signal time domain resources allocation for Physical Downlink Shared Channel (PDSCH) according to Remaining Minimum System Information (RMSI) Control Resource Set (CORESET) configurations.

In another aspect of the disclosure, a communication system including a host computer comprising processing circuitry configured to provide user data and a communication interface configured to forward the user data to a cellular network for transmission to a user equipment (UE) is provided. The cellular network comprises a base station having a radio interface and processing circuitry. The base station's processing circuitry is configured to allocate time domain resources for downlink shared channel at least according to Control Resource Set (CORESET) configurations.

In another aspect of the disclosure, a communication system including a host computer comprising processing circuitry configured to provide user data and a communication interface configured to forward the user data to a cellular network for transmission to a user equipment (UE) is provided. The cellular network comprises a base station having a radio interface and processing circuitry. The base station's processing circuitry is configured to utilize time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a communication system including a host computer comprising processing circuitry configured to provide user data and a communication interface configured to forward the user data to a cellular network for transmission to a user equipment (UE) is provided. The cellular network comprises a base station having a radio interface and processing circuitry. The base station's processing circuitry is configured to signal time domain resources allocation for Physical Downlink Shared Channel (PDSCH) according to Remaining Minimum System Information (RMSI) Control Resource Set (CORESET) configurations.

In another aspect of the disclosure, a method implemented in a base station is provided comprising allocating time domain resources for downlink shared channel at least according to Control Resource Set (CORESET) configurations.

In another aspect of the disclosure, a method implemented in a base station is provided comprising utilizing time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a method implemented in a base station is provided comprising signaling time domain resources allocation for Physical Downlink Shared Channel (PDSCH) according to Remaining Minimum System Information (RMSI) Control Resource Set (CORESET) configurations.

In another aspect of the disclosure, a method implemented in a communication system including a host computer, a base station and a user equipment (UE) is provided. The method comprises: at the host computer, providing user data; and at the host computer, initiating a transmission carrying the user data to the UE via a cellular network comprising the base station, wherein the base station allocates time domain resources for downlink shared channel at least according to Control Resource Set (CORESET) configurations.

In another aspect of the disclosure, a method implemented in a communication system including a host computer, a base station and a user equipment (UE) is provided. The method comprises: at the host computer, providing user data; and at the host computer, initiating a transmission carrying the user data to the UE via a cellular network comprising the base station, wherein the base station utilize time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a method implemented in a communication system including a host computer, a base station and a user equipment (UE) is provided. The method comprises: at the host computer, providing user data; and at the host computer, initiating a transmission carrying the user data to the UE via a cellular network comprising the base station, wherein the base station signals time domain resources allocation for Physical Downlink Shared Channel (PDSCH) according to Remaining Minimum System Information (RMSI) Control Resource Set (CORESET) configurations.

In another aspect of the disclosure, a user equipment (UE) configured to communicate with a base station is provided. The UE comprises a radio interface and processing circuitry configured to determine time domain resources for downlink shared channel at least according to Control Resource Set (CORESET) configurations.

In another aspect of the disclosure, a user equipment (UE) configured to communicate with a base station is provided. The UE comprises a radio interface and processing circuitry configured to utilize time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a communication system including a host computer comprising processing circuitry configured to provide user data and a communication interface configured to forward user data to a cellular network for transmission to a user equipment (UE) is provided. The UE comprises a radio interface and processing circuitry. The UE's processing circuitry is configured to determine time domain resources for downlink shared channel at least according to Control Resource Set (CORESET) configurations.

In another aspect of the disclosure, a communication system including a host computer comprising processing circuitry configured to provide user data and a communication interface configured to forward user data to a cellular network for transmission to a user equipment (UE) is provided. The UE comprises a radio interface and processing circuitry. The UE's processing circuitry is configured to utilize time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a method implemented in a user equipment (UE) is provided comprising determining time domain resources for downlink shared channel at least according to Control Resource Set (CORESET) configurations.

In another aspect of the disclosure, a method implemented in a user equipment (UE) is provided comprising utilizing time domain resources for downlink shared channel at least according to Control Resource Set (CORESET) configurations, wherein the CORESET configuration is determined by a CORESET position and the CORESET position is configured by Physical Broadcast Channel (PBCH).

In another aspect of the disclosure, a method implemented in a communication system including a host computer, a base station and a user equipment (UE) is provided. The method comprises: at the host computer, providing user data; and at the host computer, initiating a transmission carrying the user data to the UE via a cellular network comprising the base station, wherein the UE determines time domain resources for downlink shared channel at least according to Control Resource Set (CORESET) configurations.

In another aspect of the disclosure, a method implemented in a communication system including a host computer, a base station and a user equipment (UE) is provided. The method comprises: at the host computer, providing user data; and at the host computer, initiating a transmission carrying the user data to the UE via a cellular network comprising the base station, wherein the UE utilizes time domain resources for downlink shared channel at least according to Control Resource Set (CORESET) configurations, wherein the CORESET configuration is determined by a CORESET position and the CORESET position is configured by Physical Broadcast Channel (PBCH).

Embodiments of the disclosure are provided for the allocation of time domain resources for downlink shared channel according to the CORESET configurations, which reduces or even eliminates need for signaling in DCI.

BRIEF DESCRIPTION OF THE DRAWINGS

The disclosure may best be understood by referring to the following description and accompanying drawings that are used to illustrate the various embodiments. In the drawings.

DETAILED DESCRIPTION

Figure 1:
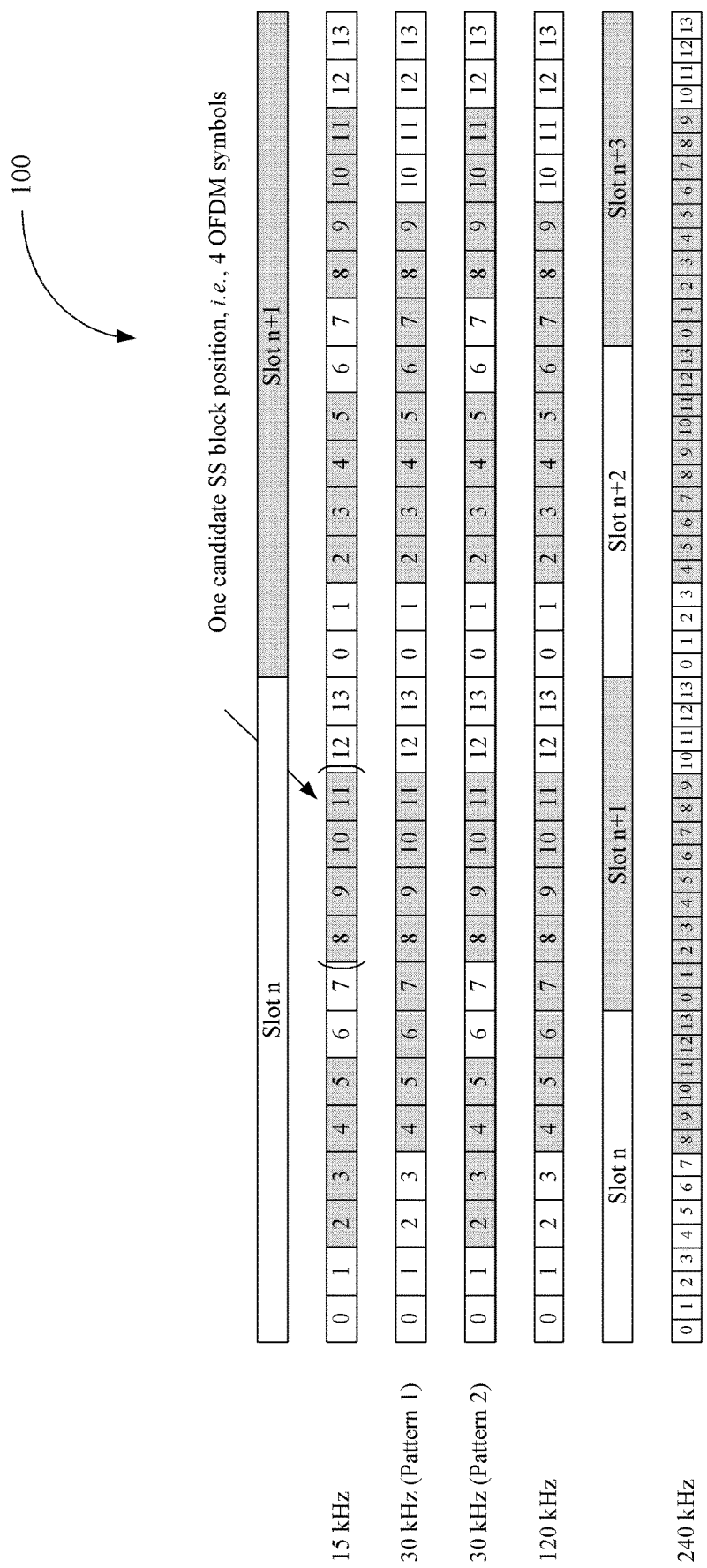
FIG. 1 shows a diagram of SS/PBCH block symbols in slots, where each small box is an Orthogonal Frequency Division Multiplexing (OFDM) symbol and where dark symbols are mapped.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

SS/PBCH Block in New Radio

In order to connect to a network, a device needs to acquire network synchronization (synch) and obtain essential System Information (SI) including SI in Master Information Block (MIB) and Remaining Minimum System Information (RMSI). Synchronization signals are used for adjusting the frequency of the device relative to the network, and for finding proper timing of the received signal from the network. In the New Radio (NR), the synchronization and access procedure may involve several signals:

Primary Synchronization Signal (PSS) that allows for network detection in the presence of a high initial frequency error, up to tens of ppm.

Secondary Synchronization Signal (SSS) that allows for more accurate frequency adjustments and channel estimation while at the same time providing fundamental network information (e.g., cell ID).

Physical Broadcast CHannel (PBCH) that provides a subset of the minimum system information for random access and configurations for fetching remaining minimum system information in RMSI. It also provides timing information within a cell (e.g., to separate timing between beams transmitted from a cell). The amount of information to fit into the PBCH is of course highly limited to keep the size down. Furthermore, Demodulation Reference Signal(s) (DMRS) are interleaved with PBCH resources to receive it properly.

Synchronization Signal and PBCH block (SS/PBCH block, or SSB in shorter format) comprises the above signals (PSS, SSS and PBCH DMRS), and PBCH. SSB may have 15 kHz, 30 kHz, 120 kHz or 240 kHz Subcarrier Spacing (SCS) depending on the frequency range.

Figure 2:
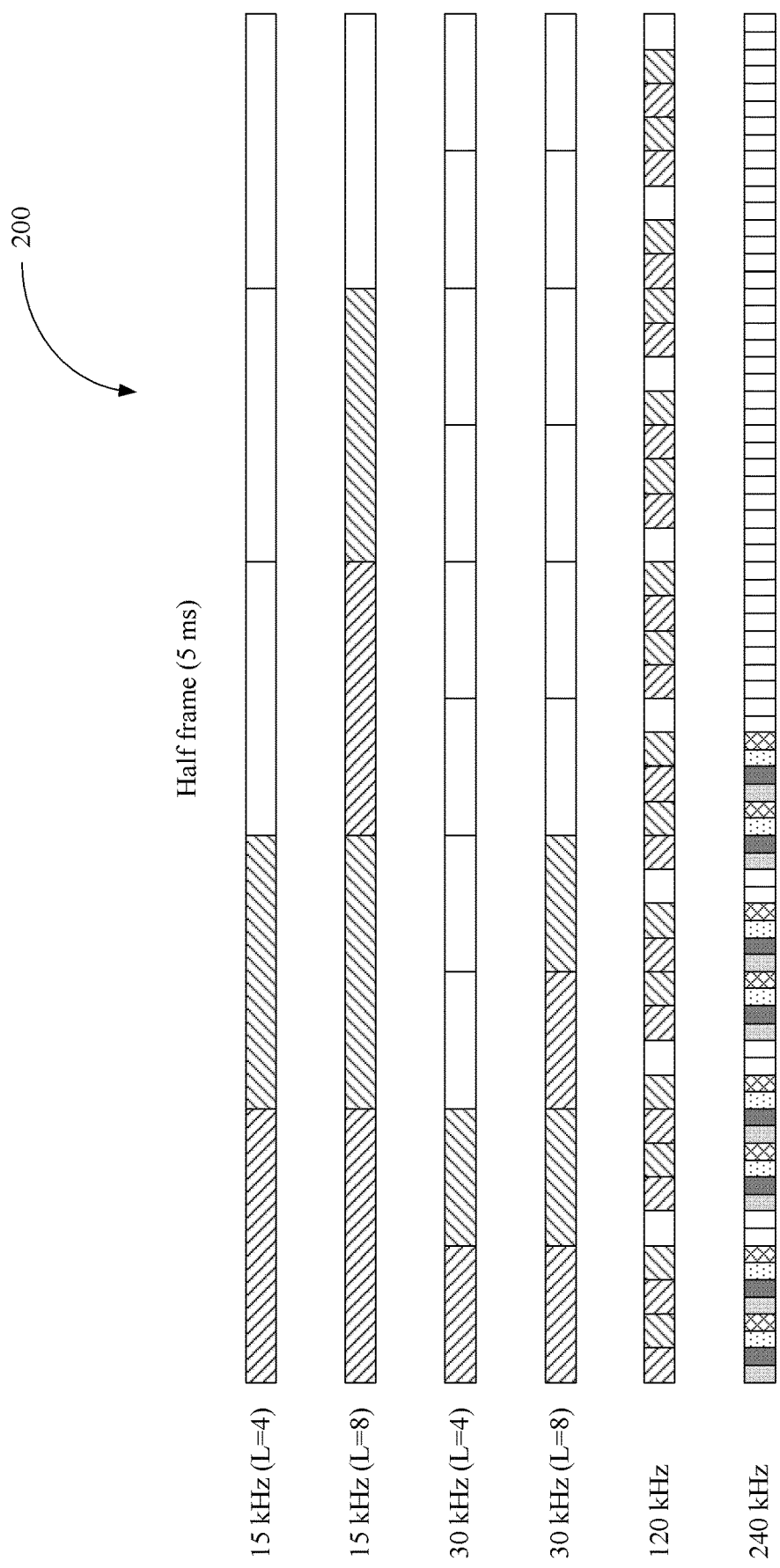
FIG. 2 shows a diagram of SS burst set in slots within 5 ms, where each box is a slot and where dark slots are mapped.

A number of (typically rather close in time) SS/PBCH blocks constitute an SS burst set. An SS burst set is transmitted periodically with the periodicity configured in RMSI. 20 ms SS burst set periodicity is assumed for initial access. FIG. 1 and FIG. 2 illustrate details about the SS/PBCH block mapping within slots and SS burst set mapping to slots within 5 ms. FIG. 1 shows a diagram 100 of SS/PBCH block symbols in slots, where each small box is an Orthogonal Frequency Division Multiplexing (OFDM) symbol and where dark symbols are mapped. FIG. 2 shows a diagram 200 of SS burst set in slots within 5 ms, where each box is a slot and where dark slots are mapped.

RMSI and Control Resource Set (CORESET) Configured by PBCH in NR

Remaining Minimum System Information (RMSI) is carried in Physical Downlink Shared Channel (PDSCH) scheduled by Physical Downlink Control Channel (PDCCH) in CORESET configured by PBCH in NR, and contains the remaining subset of minimum system information (e.g., the bit map of the actually transmitted SS/PBCH blocks).

CORESET configured by PBCH, which can also be used for OSI/PAGING/RAR, consists of a number ($N_{RB}^{CORESET}$) of resource blocks in the frequency domain, and a number ($N_{symb}^{CORESET}$) of OFDM symbols in the time domain. Based on 3GPP TS38.213 V15.0.0, $N_{RB}^{CORESET}$ can be 24, 48 or 96, and $N_{symb}^{CORESET}$ can be 1, 2, 3 OFDM symbols.

A number of CCEs and REGs are defined in the CORESET. A Control-Channel Element (CCE) consists of 6 Resource-Element Groups (REGs) where a resource-element group equals one resource block during one OFDM symbol. Resource-element groups within a control-resource set are numbered in increasing order in a time-first manner, starting with 0 for the first OFDM symbol and the lowest-numbered resource block in the control resource set.

Figure 3:
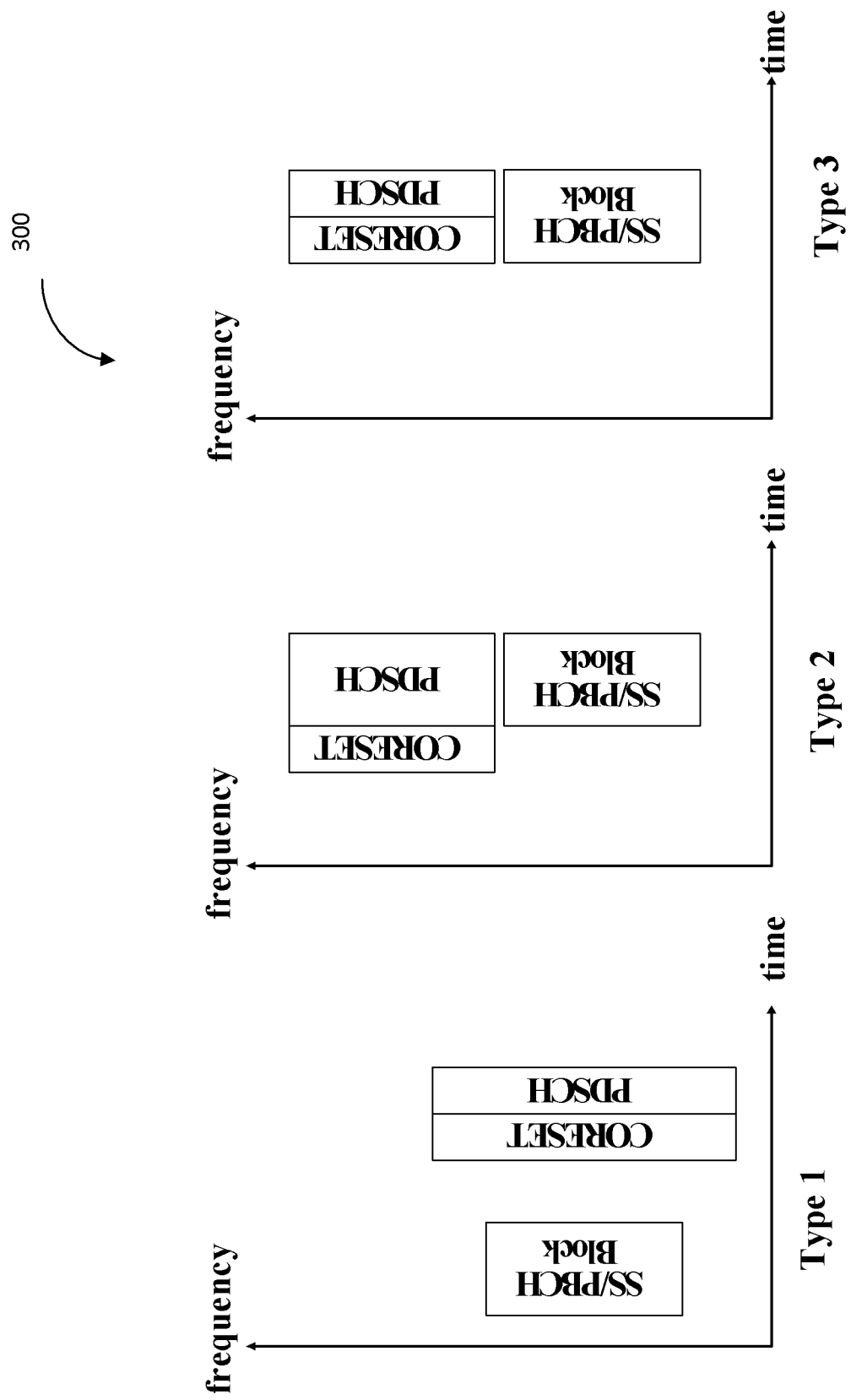
FIG. 3 shows a diagram of SS/PBCH block and CORESET configured by PBCH multiplexing types of Type 1, Type 2, and Type 3 with some embodiments.

After detecting one SS/PBCH block, a User Equipment (UE) can try to search the possible PDCCH candidates based on the CORESET configurations in PBCH. Between SS/PBCH block and the configured CORESET, there are 3 multiplexing types, each of which has a set of supported numerology combinations {SSB SCS, RMSI SCS}. FIG. 3 shows a diagram 300 of SS/PBCH block and CORESET configured by PBCH multiplexing types (Type 1, Type 2, and Type 3) and supported numerology combinations for three types, Type 1, Type 2, and Type 3 are described below.

For FIG. 3, the supported numerology combinations for the three types are as follows: Type 1 at sub-6 GHz has configurations of {15 kHz, 15 kHz}, {15 kHz, 30 kHz}, {30 kHz, 15 kHz} and {30 kHz, 30 kHz}. At over-6 GHz, the configurations are {120 kHz, 60 kHz}, {120 kHz, 120 kHz}, {240 kHz, 60 kHz} and {240 kHz, 120 kHz}. For Type 2 the configurations are {120 kHz, 60 kHz} and {240 kHz, 120 kHz}. For type 3, the configuration is {120 kHz, 120 kHz}. Note pattern 2 (Type 2) and pattern 3 (Type 3) are only supported in over-6 GHz frequency bands.

In one of the 3GPP meetings (RAN1 #90 bis), a following agreement was reached regarding the relationship between bandwidth of PDSCH and bandwidth of the CORESET containing the PDCCH scheduling this PDSCH.

The initial active DL BWP is defined as frequency location and bandwidth of RMSI CORESET and numerology of RMSI; and PDSCH delivering RMSI are confined within the initial active DL BWP In one of the 3GPP meetings (RAN1 Ad-Hoc #1801), a following agreement was reached regarding the Downlink Control Information (DCI) format for RMSI/OSI/paging and random access. Detail content of DCI is not defined yet.

NR supports a DCI format having the same size as the DCI format 1_0 to be used for scheduling RMSI/OSI, for Paging, and for random access.

Following agreement was reached in one of the NR meetings (NR AdHoc #3) regarding the PDSCH transmissions for RMSI.

NR supports both slot based PDCCH and PDSCH, and non-slot based PDSCH transmissions for RMSI/broadcast OSI delivery For the non-slot based transmission, 2, 4 and 7 OFDM-symbol duration for the RMSUbroadcast OSI PDSCH is supported Following agreement was reached in one of the 3GPP meetings (RAN1 #91) regarding the DMRS patterns of PDSCH carrying RMSI.

Confirm working assumption of using configuration Type 1 for slot-based broadcast/multicast PDSCH and extend this DMRS type to:

slot-based unicast PDSCH before RRC configuration and slot-based unicast PUSCH before RRC configuration (CP-OFDM and DFT-S-OFDM)

For slot-based broadcast/multicast PDSCH and unicast PDSCH/PUSCH before RRC configuration, use two additional 1-symbol DMRS, with location of additional DMRS indicated in PDCCH following the agreed DMRS locations for unicast PDSCH/PUSCH after RRC configuration.

2/4/7-symbol non-slot-based scheduling for multicast/broadcast PDSCH and unicast PDSCH before RRC configuration.

For 2/4-symbol non-slot-based scheduling, the one-symbol front-load DMRS is used for broadcast/multicast PDSCH and unicast PDSCH/PUSCH before RRC configuration.

For 7-symbol non-slot-based scheduling, one-symbol front-load DMRS plus one additional DMRS symbol on the 5th symbol, if it is part of the scheduling unit with respect to the front-load is used for broadcast/multicast PDSCH and unicast PDSCH/PUSCH before RRC configuration.

Broadcast/multicast PDSCH and PDSCH before RRC configuration is happening, for both slot and 4/7-symbol non-slot-based, with DMRS port 0 using SU-MIMO and no PDSCH FDMed on the DMRS symbol. For 2 symbol non-slot based, there is only FDM.

Monitoring Window of PDCCH in CORESET Configured by PBCH in NR

PDCCH monitoring window in RMSI CORESET can be different for different multiplexing types between SS/PBCH block and RMSI CORESET.

For the SS/PBCH block and control resource set (CORESET) multiplexing pattern 1 (Type1), a UE monitors PDCCH in the Type0-PDCCH common search space over two consecutive slots starting from slot $n_0$. For SS/PBCH block with index i, the UE determines an index of slot $n_0$ as $n_0 = (O \cdot 2^\mu + \lfloor i \cdot M \rfloor) \bmod N_{slot}^{frame,\mu}$ located in a frame with system frame number (SFN) $SFN_C$ satisfying $SFN_C$ mod 2=0 or $\lfloor (O \cdot 2^\mu + \lfloor i \cdot M \rfloor)/N_{slot}^{frame,\mu} \rfloor$ mod 2=0 in a frame with SFN satisfying $SFN_C$ mod 2=1 if $\lfloor (O \cdot 2^\mu + \lfloor i \cdot M \rfloor)/N_{slot}^{frame,\mu} \rfloor$ mod 2=1. M and O are provided by Tables 1 and 2, and $\mu \in \{0, 1, 2, 3\}$ based on the subcarrier spacing for PDCCH receptions in the control resource set [4, TS 38.211]. The index for the first symbol of the control resource set in slot $n_c$ is the first symbol index provided by Tables 1 and 2.

Table 1 shows parameters for PDCCH monitoring occasions for Type0-PDCCH common search space—SS/PBCH block and control resource set multiplexing pattern 1 and for carrier frequencies smaller than or equal to 6 GHz.

TABLE 1

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {$N_{symb}^{CORESET}$, if i is odd} |
| 2 | 2 | 1 | 1 | 0 |
| 3 | 2 | 2 | 1/2 | {0, if i is even}, {$N_{symb}^{CORESET}$, if i is odd} |
| 4 | 5 | 1 | 1 | 0 |
| 5 | 5 | 2 | 1/2 | {0, if i is even}, {$N_{symb}^{CORESET}$, if i is odd} |

TABLE 1-continued

| Index | O | Number of search space sets per slot | M | First symbol index |
|---|---|---|---|---|
| 6 | 7 | 1 | 1 | 0 |
| 7 | 7 | 2 | 1/2 | {0, if i is even}, {$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

Table 2 shows parameters for PDCCH monitoring occasions for Type0-PDCCH common search space—SS/PBCH block and control resource set multiplexing pattern 1 and for carrier frequencies above 6 GHz.

TABLE 2

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 2.5 | 1 | 1 | 0 |
| 3 | 2.5 | 2 | 1/2 | {0, if i is even}, {7, if i is odd} |
| 4 | 5 | 1 | 1 | 0 |
| 5 | 5 | 2 | 1/2 | {0, if i is even}, {7, if i is odd} |
| 6 | 0 | 2 | 1/2 | {0, if i is even}, {$N_{symb}^{CORESET}$, if i is odd} |
| 7 | 2.5 | 2 | 1/2 | {0, if i is even}, {$N_{symb}^{CORESET}$, if i is odd} |
| 8 | 5 | 2 | 1/2 | {0, if i is even}, {$N_{symb}^{CORESET}$, if i is odd} |
| 9 | 7.5 | 1 | 1 | 0 |
| 10 | 7.5 | 2 | 1/2 | {0, if i is even}, {7, if i is odd} |
| 11 | 7.5 | 2 | 1/2 | {0, if i is even}, {$N_{symb}^{CORESET}$, if i is odd} |
| 12 | 0 | 1 | 2 | 0 |
| 13 | 5 | 1 | 2 | 0 |
| 14 | | | Reserved | |
| 15 | | | Reserved | |

Figure 4:
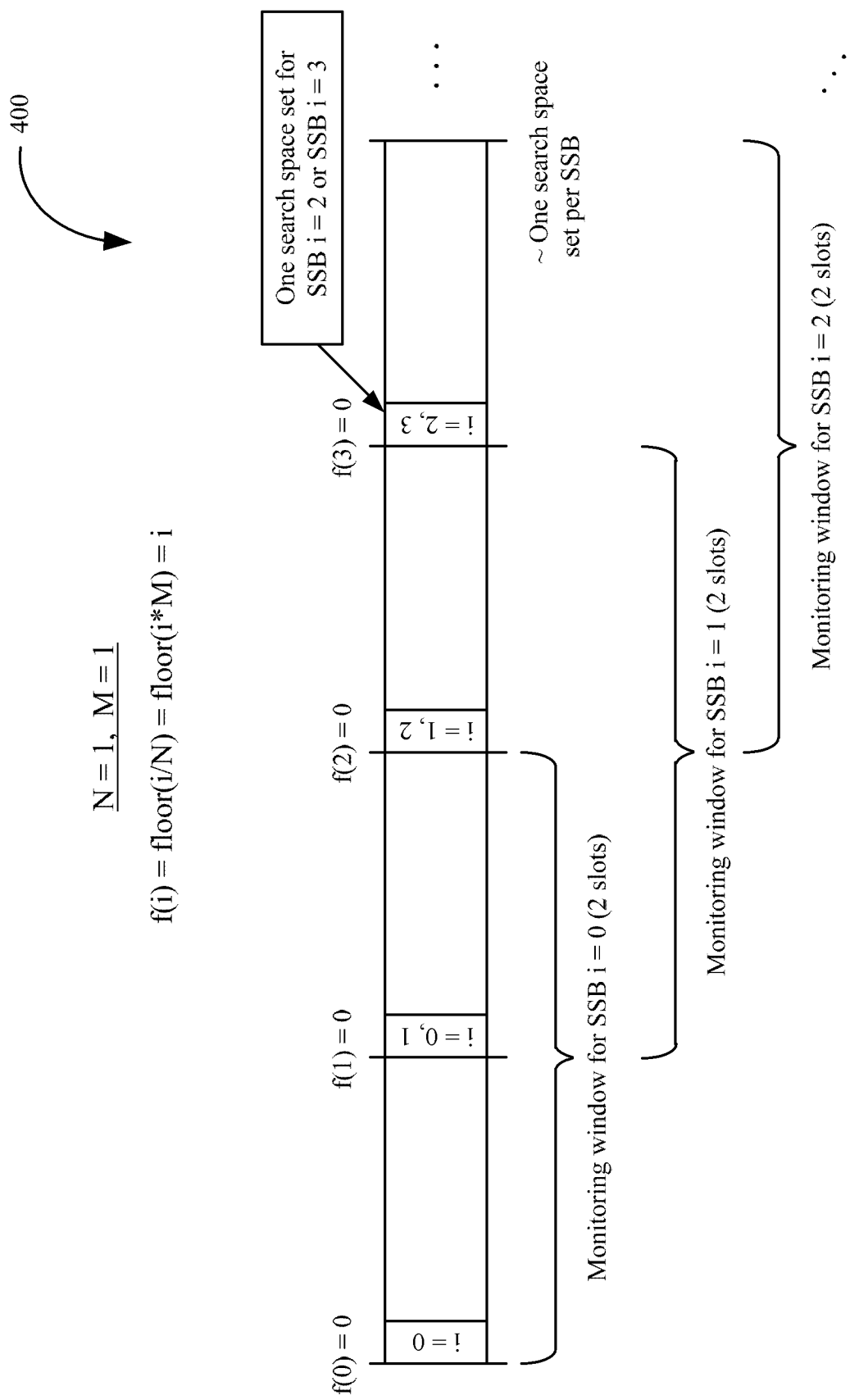
FIG. 4 shows a diagram illustrating PDCCH monitoring windows in RMSI CORSET when M=1 with some embodiments.
Figure 5:
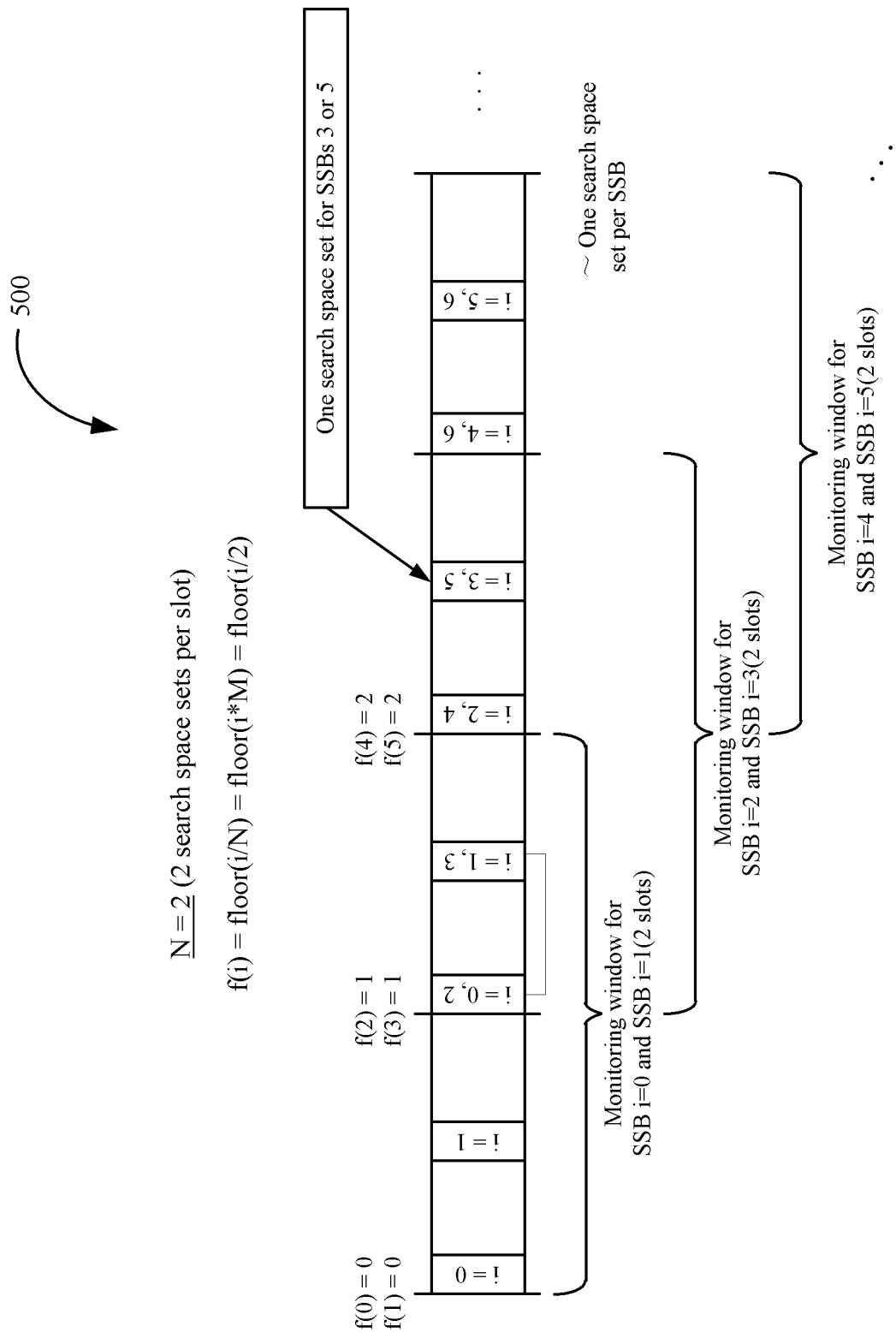
FIG. 5 shows a diagram illustrating PDCCH monitoring windows in RMSI CORSET when M=½ with some embodiments.

FIG. 4 and FIG. 5 shows the possible PDCCH monitoring windows in RMSI CORESET when M=1 or M=½ respectively. FIG. 4 shows diagram 400 illustrating PDCCH monitoring windows in RMSI CORSET when M=1. FIG. 5 shows diagram 500 illustrating PDCCH monitoring windows in RMSI CORSET when M=½. Where N=1/M, N=1, M=1 in FIG. 4 and N=2 in FIG. 5.

Based on Table 1 and 2 (which are respectively Tables 13-11 and Table 13-12 from latest 3GPP TS38.213 V15.0.1), and the Figures noted above, when M<1, there could be more than 1 search space set per slot. When M>=1, there would be only 1 search space set per slot. The 1$^{st}$ symbol index might be 0, 7 or $N_{symb}^{CORESET}$ based on the table and specific configurations shown in these 2 tables.

For the SS/PBCH block and control resource set multiplexing patterns 2 and 3, a UE monitors PDCCH in the Type0-PDCCH common search space over one slot with Type0-PDCCH common search space periodicity equal to the periodicity of SS/PBCH block. For a SS/PBCH block with index i, the UE determines the slot index $n_c$ and $SFN_C$ based on parameter provided in other tables (such as Tables 13-13 through 13-15 in 3GPP TS 38.213).

There currently exist certain challenge(s). As is known, the signaling of PDSCH scheduling information in time domain in DCI is quite expensive. For the PDSCH transmissions after RRC connection, some extra signaling can be fetched from RRC to keep low overhead of DCI. RMSI could be decoded before RRC connection, so the allocation of PDSCH carrying RMSI in time domain may need to be specially defined. Similar issue may happen for paging/RAR and other messages before RRC.

Certain aspects of the present disclosure and their embodiments may provide solutions to these or other challenges. For example, in the described embodiments, some definitions are proposed for the time domain allocation of PDSCH carrying RMSI/PAGING/RAR etc. before RRC connection, based on the RMSI CORESET configurations in PBCH. Also, RMSI CORSET configuration based definitions are proposed for the time domain allocation of PDSCH carrying messages such as RMSI/RAR/PAGING before RRC connection.

Certain embodiments may provide one or more of the following technical advantage(s). A methods is provided for the allocation of PDSCH carrying RMSI/PAGING/RAR etc. before RRC connection in time domain according to the possible CORESET positions configured by PBCH, which requires less or no signaling in DCI.

In the following, some definitions or signaling are proposed for the time domain allocation of PDSCH carrying RMSI/PAGING/RAR etc., before RRC connection according to the RMSI CORESET configurations from PBCH in this disclosure. The signaling, if necessary for some configurations, may be in the corresponding DCI scheduling the PDSCH.

Example embodiments are given below:
1) If SS/PBCH block and RMSI CORESET are multiplexed with pattern 2 (Type 2) or pattern 3 (Type3) of FIG. 3, then:
   a) no DCI signaling is needed, and
     i) for Pattern 2, UE can assume PDSCH starts from the 1st symbol of SS/PBCH block and ends up with the last symbol of SS/PBCH block; and
     ii) for Pattern 3, UE can assume PDSCH starts right after the last symbol of RMSI CORESET and ends up with the last symbol of SS/PBCH block.
   b) DCI signaling may be needed if different number of symbols are wanted for PDSCH, some extra signaling (e.g., 2 bits) may be introduced to indicate this for pattern 2 or pattern 3.

2) If SS/PBCH block and RMSI CORESET are multiplexed with pattern 1 (Type 1) of FIG. 3, then:
   a) additional 2-bit signaling may be introduced in DCI (more bits may be introduced if a time gap between RMSI CORESET and PDSCH is needed).
      i) If CORESET starts from 1st symbol of one normal slot (i.e. symbol 0) and M>=1
         (1) For non-slot-based scheduling, PDSCH starts right after CORESET (UE assumes fixed DMRS pattern per mini-slot length)
         (2) For slot-based scheduling, PDSCH starts right after CORESET till the end of the slot, fixed DMRS pattern is always used
      ii) Else,
         (1) Using non-slot-based scheduling, PDSCH starts from the 1st available symbol right after CORESET (assume fixed DMRS pattern per mini-slot length).
3) Other methods and techniques may be used as well in other embodiments and are not limited to 1) and 2) above. For example, other embodiments may employ a data structure having a fixed table to hold all possible cases and a number of bits in DCI can be used to identify an entry in the table. In instances where signaling is not needed (e.g., pattern 3), the UE does not necessary need to read these bits. Other embodiments may utilize the signaling for flexible length of PDSCH or a gap between RMSI CORSET and PDSCH. Still other embodiments may be practiced as well.

An example table could be below:

TABLE 3

Time domain allocation of PDSCH scheduled by PDCCH in CORESET configured by PBCH in one slot

| Index | start symbol index X | number of symbols Y (Note 1) | SSB and RMSI CORESET multiplexing type |
|---|---|---|---|
| 0 | 1 | 7-X | Pattern 1 |
| 1 | 2 | 7-X | Pattern 1 |
| 2 | 3 | 7-X | Pattern 1 |
| 3 | 4 | 7-X | Pattern 1 |
| 4 | 5 | 7-X | Pattern 1 |
| 5 | 1 | 14-X | Pattern 1 |
| 6 | 2 | 14-X | Pattern 1 |
| 7 | 3 | 14-X | Pattern 1 |
| 8 | 4 | 14-X | Pattern 1 |
| 9 | 5 | 14-X | Pattern 1 |
| 10 | 6 | 14-X | Pattern 1 |
| 11 | 8 | 14-X | Pattern 1 |
| 12 | 9 | 14-X | Pattern 1 |
| 13 | 10 | 14-X | Pattern 1 |
| 14 | N/A | N/A | Pattern 2/3 (Note 2) |
| 15 | reserved | reserved | reserved |

Note1:
Any uplink symbols (if exist) in this slot should be precluded for PDSCH scheduling.
Note2:
For multiplexing pattern 2, PDSCH starts from the 1st symbol of SS/PBCH block and ends up with the last symbol of SS/PBCH block;

For multiplexing Pattern 3, PDSCH starts right after the last symbol of RMSI CORESET and ends up with the last symbol of SS/PBCH block.

Figure 6:
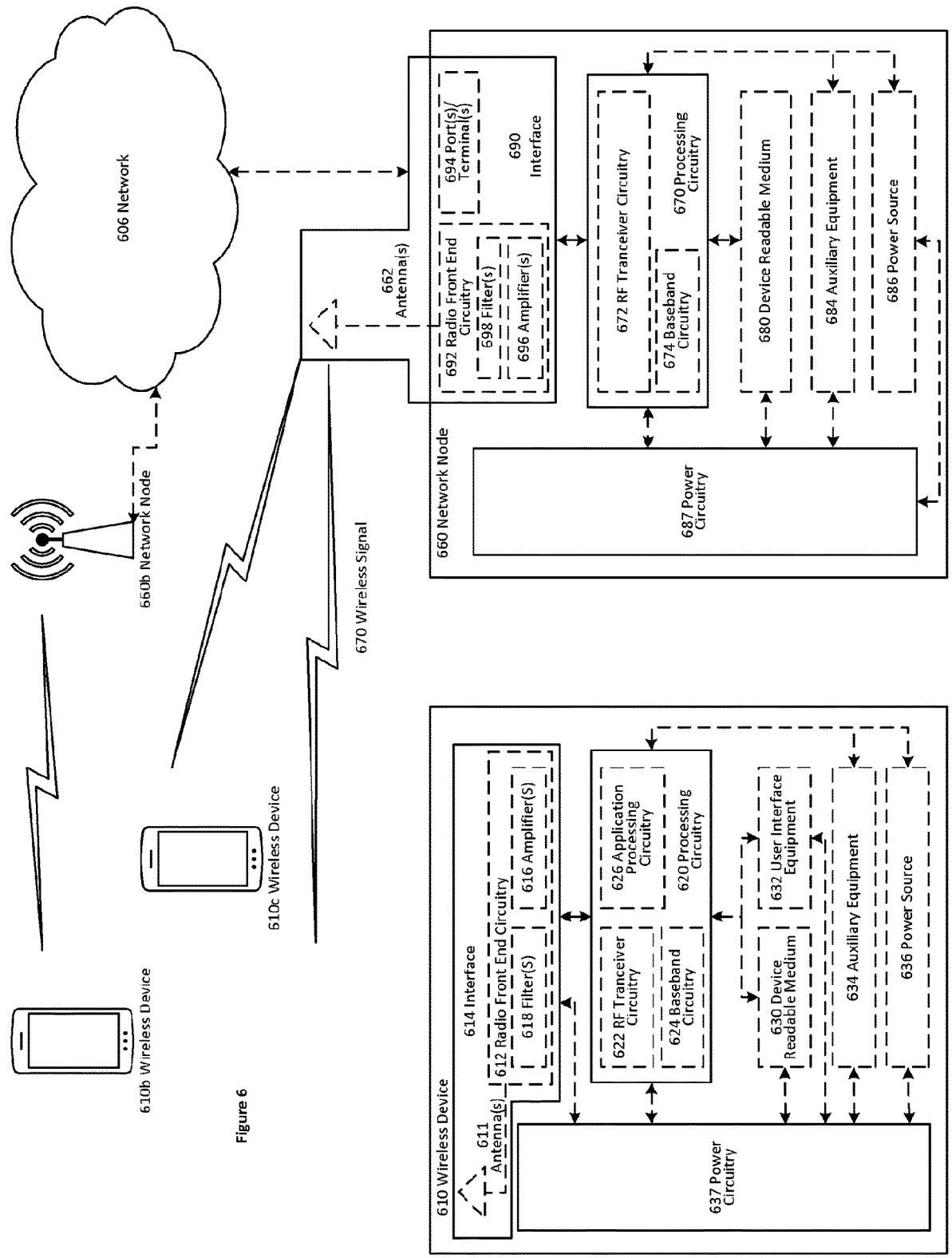
FIG. 6 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c.

In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
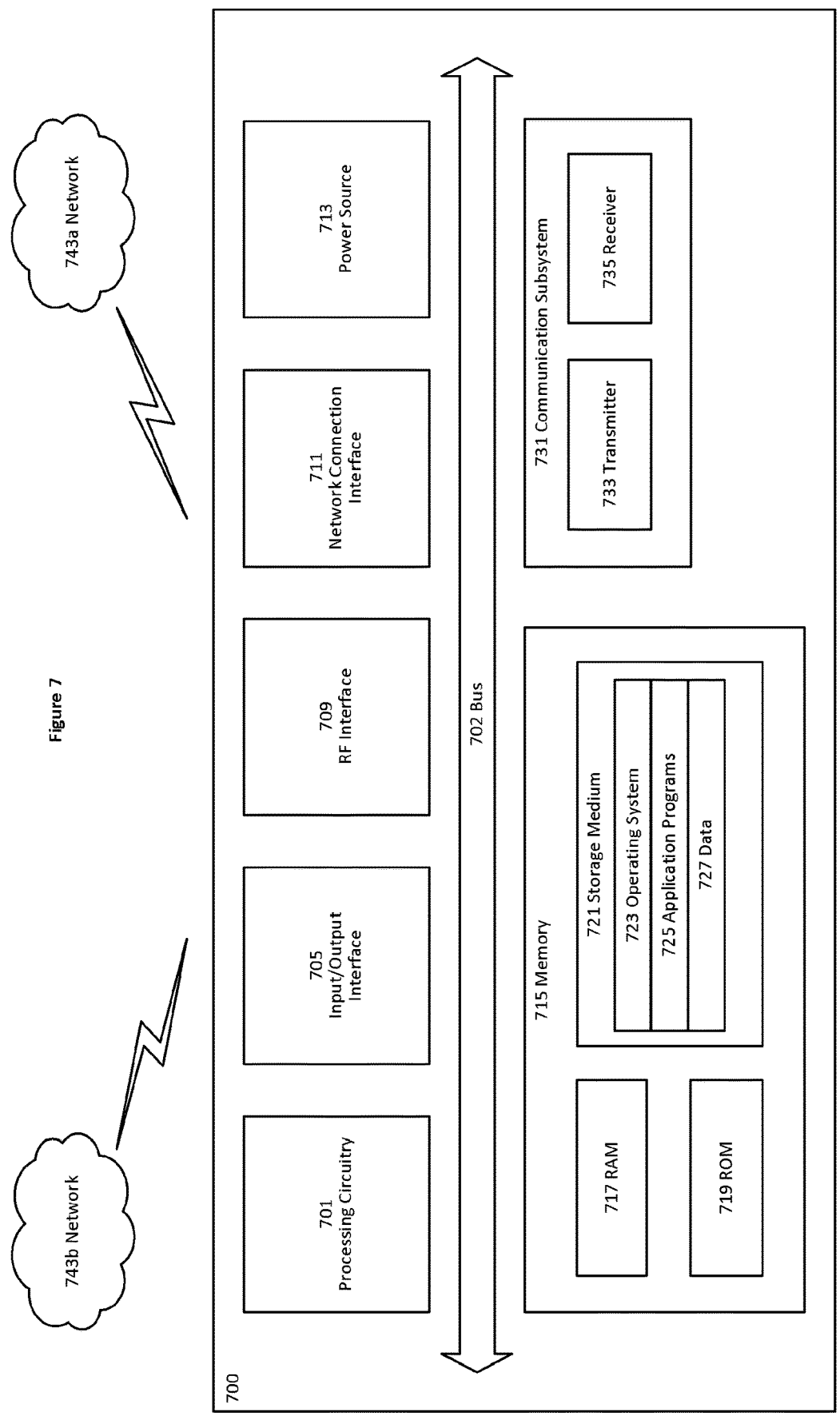
FIG. 7 shows a user Equipment in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
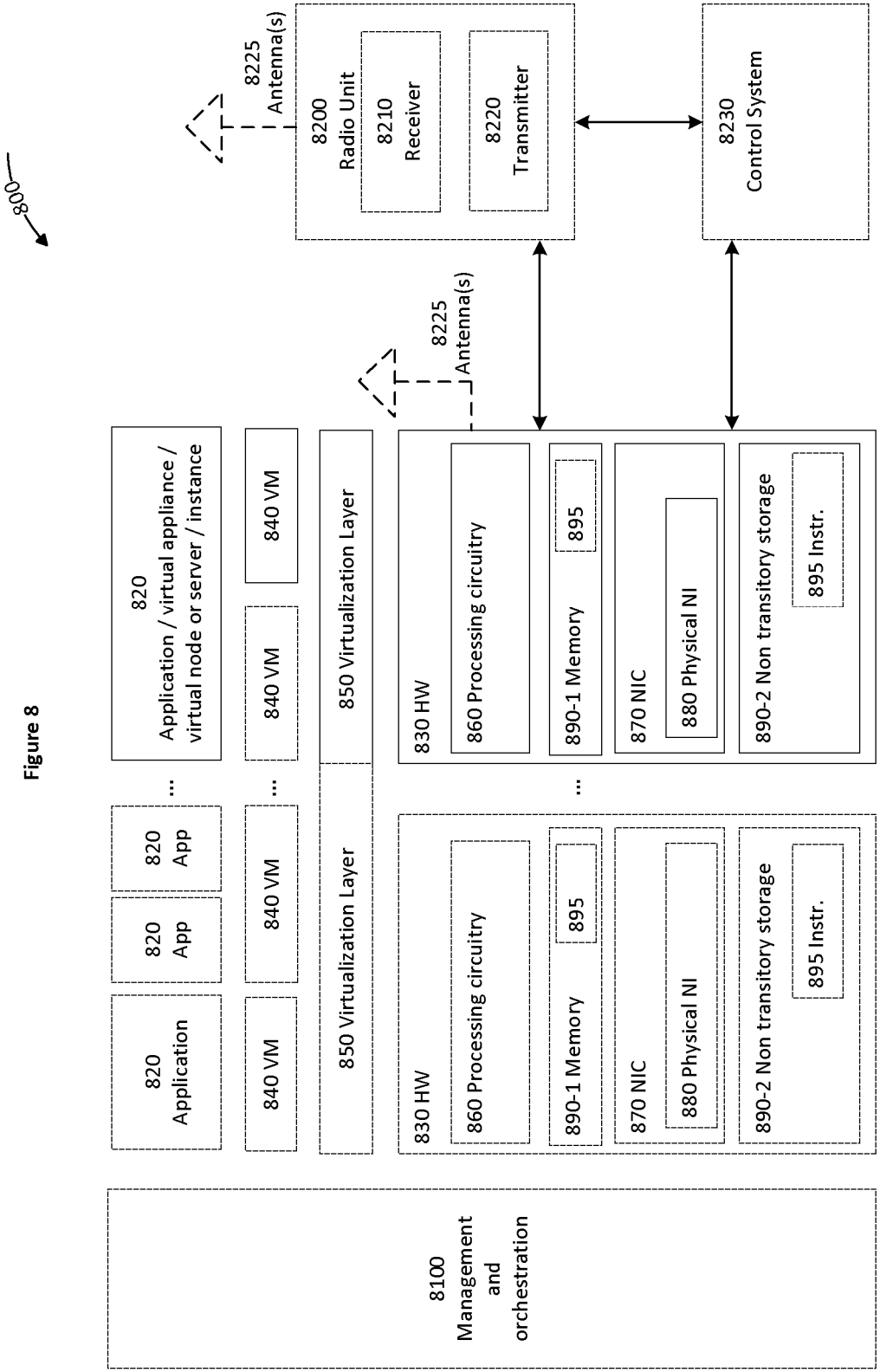
FIG. 8 shows a virtualization environment in accordance with some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
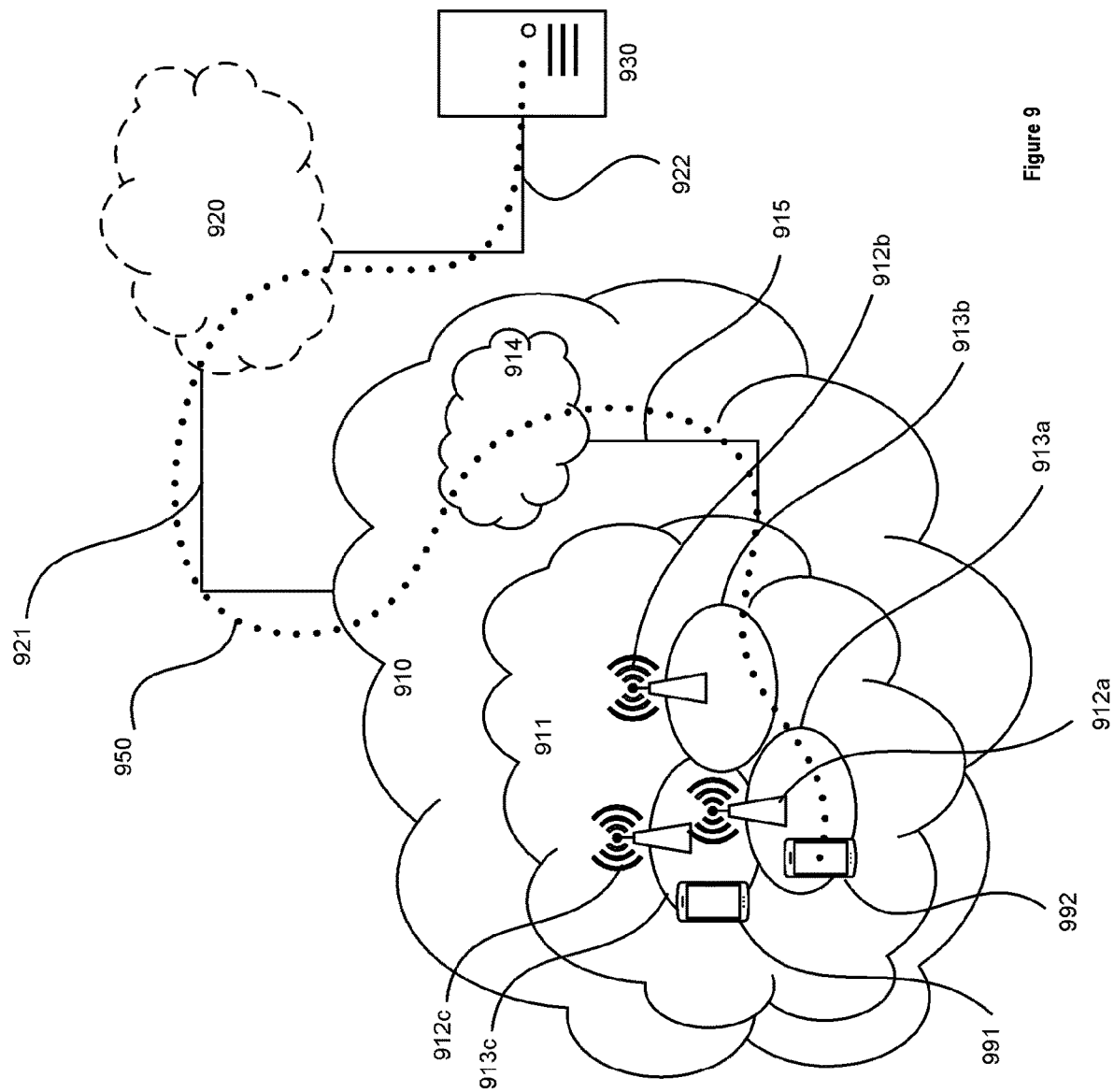
FIG. 9 shows a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912*a*, 912*b*, 912*c*, such as NBs, eNBs, gNBs or other types of wireless access points, each defining a corresponding coverage area 913*a*, 913*b*, 913*c*. Each base station 912*a*, 912*b*, 912*c* is connectable to core network 914 over a wired or wireless connection 915. A first UE 991 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. The hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
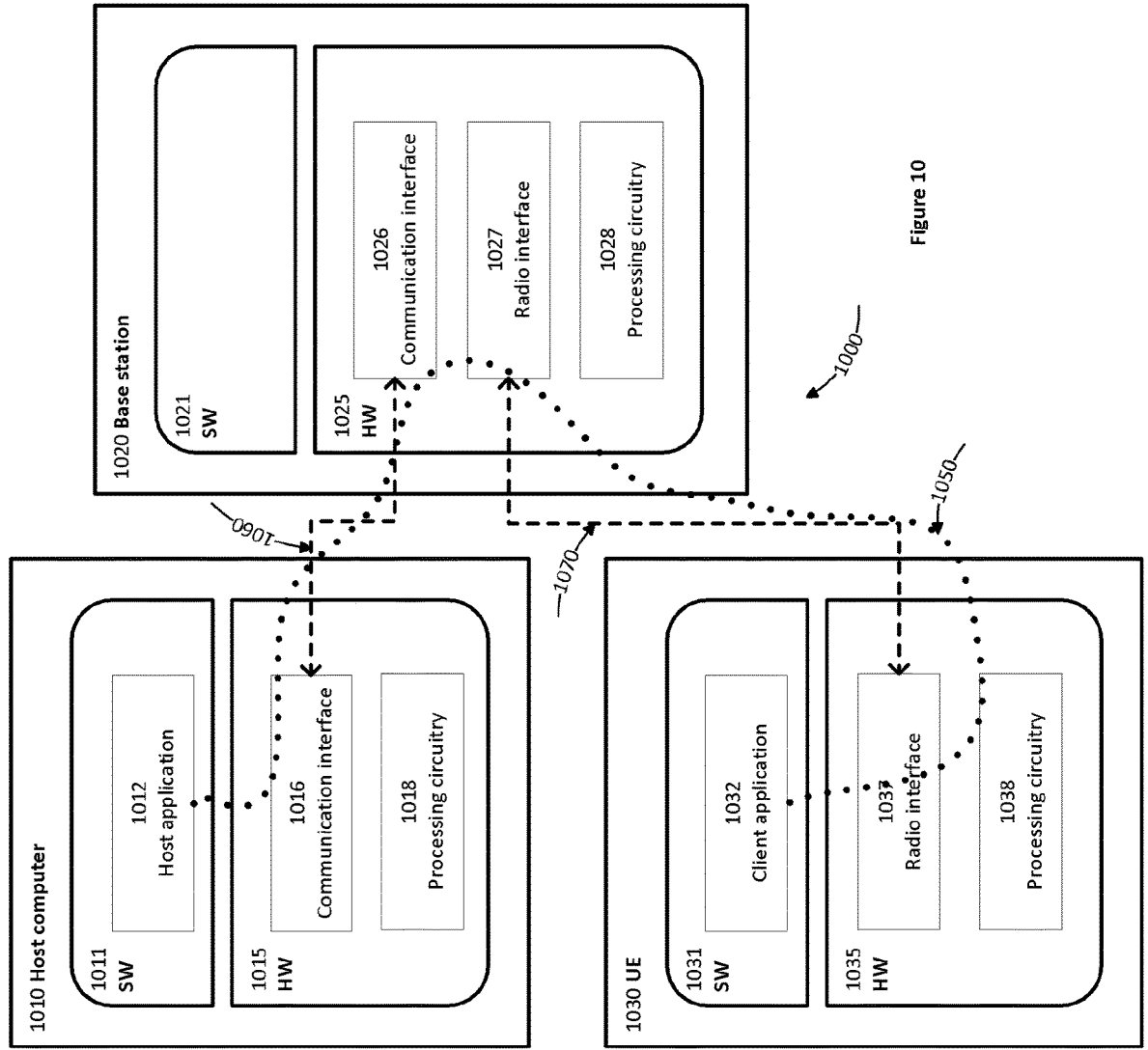
FIG. 10 shows a host computer communicating via a base station with a user equipment over a partially wireless connection in accordance with some embodiments.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
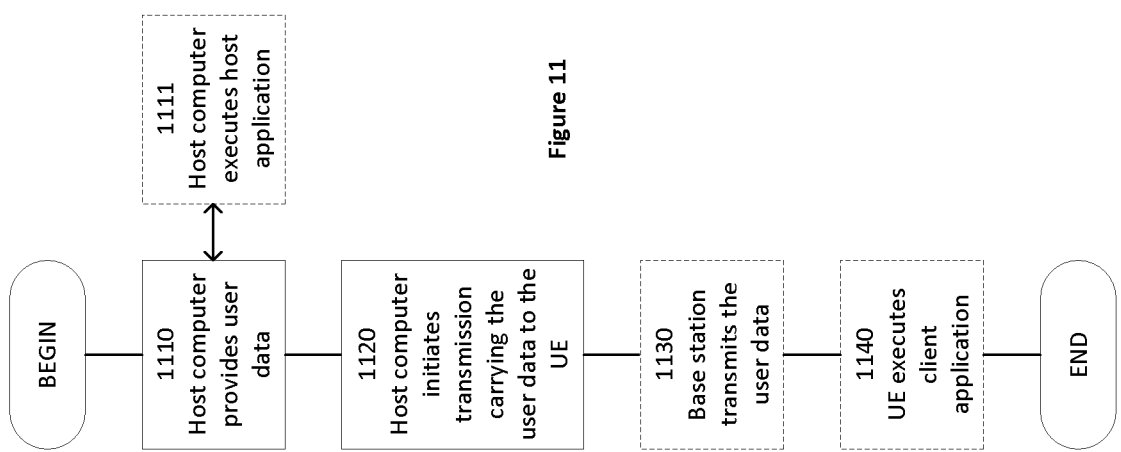
FIG. 11 shows a method implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
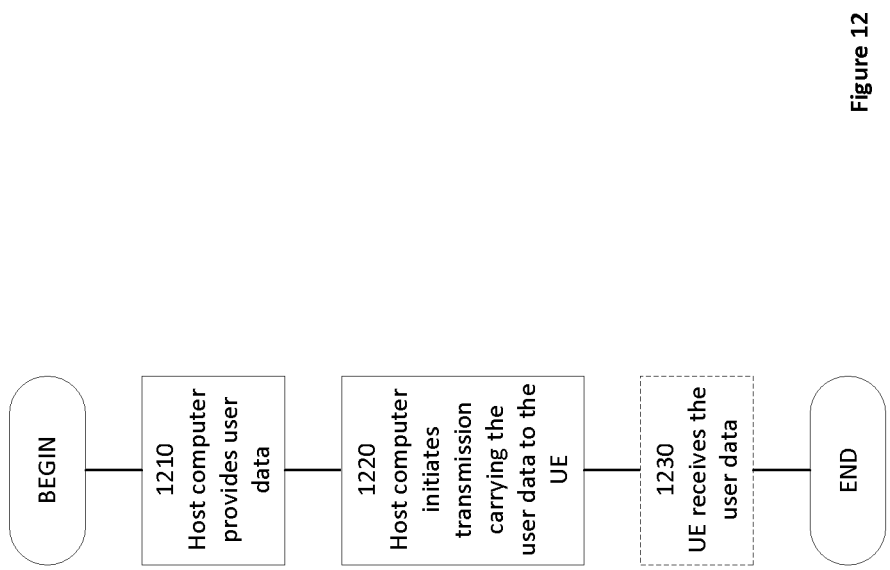
FIG. 12 shows a method implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
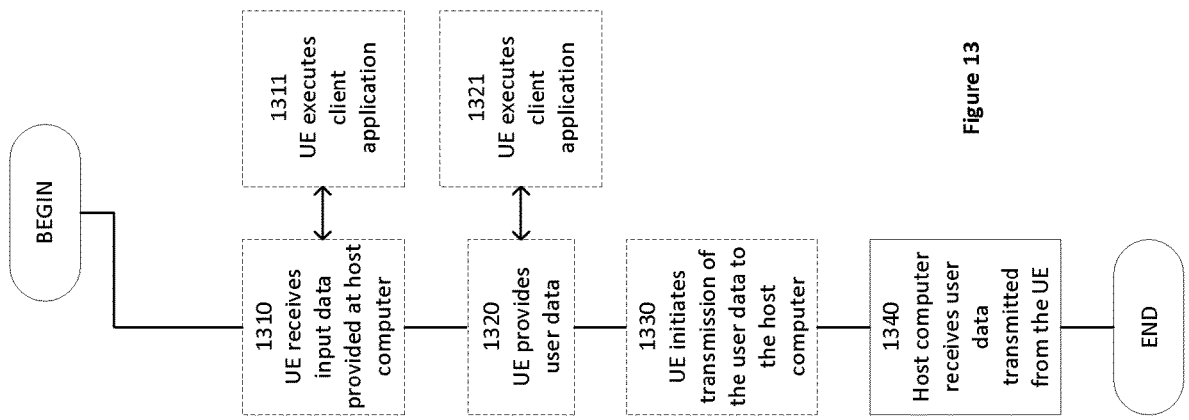
FIG. 13 shows a method implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
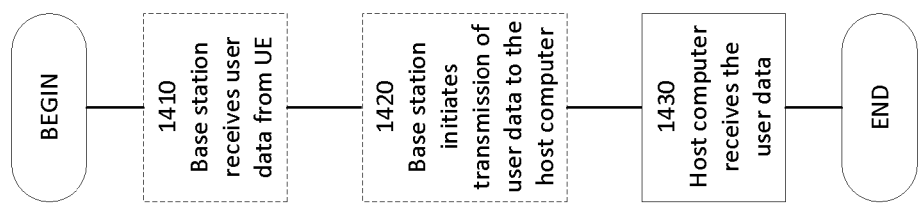
FIG. 14 shows a method implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Figure 15:
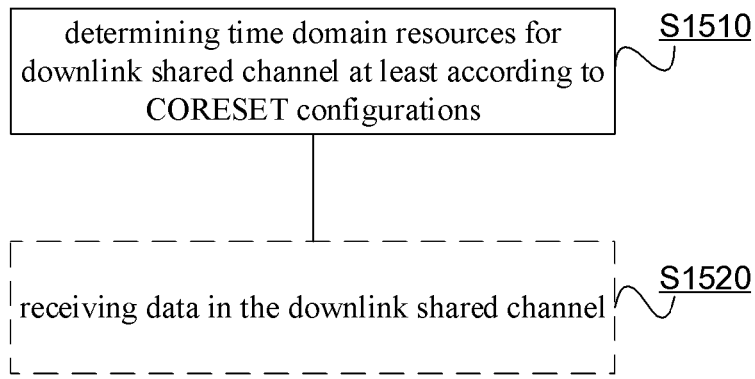
FIG. 15 is a flowchart illustrating a method in a User Equipment according to an embodiment of the disclosure.

FIG. 15 is a flowchart illustrating a method in a User Equipment according to an embodiment of the disclosure.

At block 1510, time domain resources for downlink shared channel are determined at least according to Control Resource Set (CORESET) configurations. In an embodiment, the downlink shared channel may comprise Physical Downlink Shared Channel (PDSCH).

In an embodiment, a SS/PBCH block may have a first symbol and a last symbol. The time domain resources for downlink shared channel can be determined as follows:

determining that PDSCH starts from the first symbol of the SS/PBCH block and ends with the last symbol of the SS/PBCH block, when the SS/PBCH block and Remaining Minimum System Information (RMSI) CORESET are multiplexed with Type 2 pattern;

determining that PDSCH starts immediately after a last symbol of Remaining Minimum System Information (RMSI) CORESET and ends with the last symbol of the SS/PBCH block, when the SS/PBCH block and the RMSI CORESET are multiplexed with Type 3 pattern;

when the SS/PBCH block and the RMSI CORESET are multiplexed with Type 1 pattern, if the CORESET starts from a first symbol of one normal slot, determining, for non-slot-based scheduling, that PDSCH starts immediately after the CORESET and determining, for slot-based scheduling, that PDSCH starts immediately after the CORESET till an end of the slot; or if the CORESET does not start from a first symbol of one normal slot, determining, for non-slot-based scheduling, that PDSCH starts from a first available symbol immediately after the CORESET.

At an optional block 1520, the method may further comprise receiving data in the downlink shared channel.

System Information (SI) may consist of a MIB and a number of SIBs, which are divided into Minimum SI and Other SI Minimum SI comprises basic information required for initial access and information for acquiring any other SI. In particular, Minimum SI comprises:

MIB that contains cell barred status information and essential physical layer information of the cell required to receive further system information, e.g. CORESET #0 configuration. MIB is periodically broadcast on BCH.

SIB1 that defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.

Other SI comprises all SIBs not broadcast in the Minimum SI. Those SIBs can either be periodically broadcast on DL-SCH, broadcast on-demand on DL-SCH (i.e. upon request from UEs in RRC_IDLE or RRC_INACTIVE), or sent in a dedicated manner on DL-SCH to UEs in RRC_CONNECTED. In particular, other SI comprises:

SIB2 that contains cell re-selection information, mainly related to the serving cell;

SIB3 that contains information about the serving frequency and intra-frequency neighbouring cells relevant for cell re-selection (including cell re-selection parameters common for a frequency as well as cell specific re-selection parameters);

SIB4 that contains information about other NR frequencies and inter-frequency neighbouring cells relevant for cell re-selection (including cell re-selection parameters common for a frequency as well as cell specific re-selection parameters);

SIB5 that contains information about E-UTRA frequencies and E-UTRA neighbouring cells relevant for cell re-selection (including cell re-selection parameters common for a frequency as well as cell specific re-selection parameters);

SIB6 that contains an ETWS primary notification;

SIB7 that contains an ETWS secondary notification;

SIB8 that contains a CMAS warning notification;

SIB9 that contains information related to GPS time and Coordinated Universal Time (UTC).

In an embodiment, the data received in block 1520 may comprise System Information Block (SIB), paging data, or user data. The SIB may comprise SIB1 which contains information required for initial access. In addition, the SIB may also comprise other SIBs, such as one or more of SIB2-SIB9 as mentioned above.

In an embodiment, the CORESET may be configured by Physical Broadcast Channel (PBCH).

In an embodiment, the downlink shared channel may be scheduled by a Physical Downlink Control Channel (PDCCH) with Cyclic Redundancy Check (CRC) code scrambled by System Information Radio Network Temporary Identity (SI-RNTI). The PDCCH may be monitored by the UE in a Type0 common search space.

Figure 16:
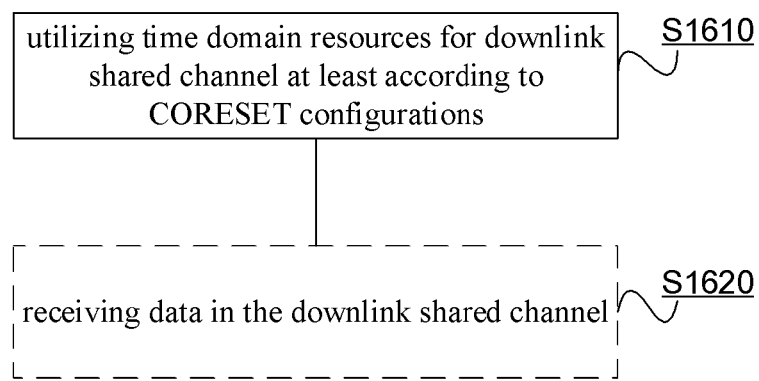
FIG. 16 is a flowchart illustrating a method in a User Equipment according to an embodiment of the disclosure.

FIG. 16 is a flowchart illustrating a method in a User Equipment according to an embodiment of the disclosure.

At block 1610, time domain resources for downlink shared channel are utilized at least according to Control Resource Set (CORESET) configurations. The CORESET configuration is determined by a CORESET position and the CORESET position is configured by Physical Broadcast Channel (PBCH). The time domain resources for downlink shared channel utilized by the UE may be those determined as have been described with reference to FIG. 15.

At an optional block 1620, the method may further comprise receiving data in the downlink shared channel. The data may comprise System Information Block (SIB), paging data, or user data. The SIB may comprise SIB1 which contains information required for initial access and other SIBs such as one or more of SIB2-SIB9, as mentioned above.

Figure 17:
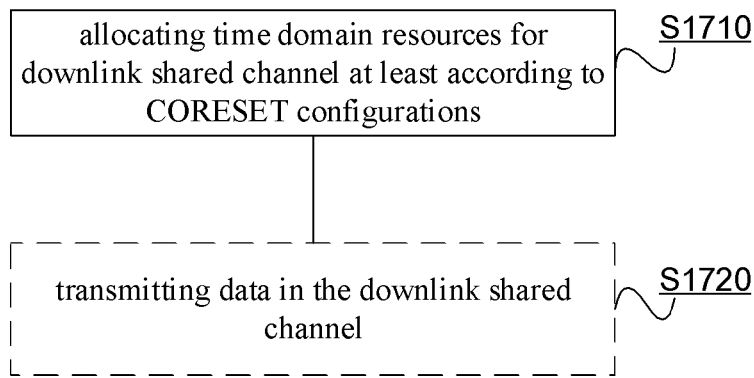
FIG. 17 is a flowchart illustrating a method in a network node according to an embodiment of the disclosure.

FIG. 17 is a flowchart illustrating a method in a network node according to an embodiment of the disclosure.

At block 1710, time domain resources for downlink shared channel are allocated at least according to Control Resource Set (CORESET) configurations. In an embodiment, the downlink shared channel may comprise Physical Downlink Shared Channel (PDSCH).

In an embodiment, a SS/PBCH block may have a first symbol and a last symbol. The time domain resources for downlink shared channel can be allocated as follows:

allocating that PDSCH starts from the first symbol of the SS/PBCH block and ends with the last symbol of the SS/PBCH block, when the SS/PBCH block and Remaining Minimum System Information (RMSI) CORESET are multiplexed with Type 2 pattern;

allocating that PDSCH starts immediately after a last symbol of Remaining Minimum System Information (RMSI) CORESET and ends with the last symbol of the SS/PBCH block, when the SS/PBCH block and the RMSI CORESET are multiplexed with Type 3 pattern;

when the SS/PBCH block and the RMSI CORESET are multiplexed with Type 1 pattern, if the CORESET starts from a first symbol of one normal slot, allocating, for non-slot-based scheduling, that PDSCH starts immediately after the CORESET and allocating, for slot-based scheduling, that PDSCH starts immediately after the CORESET till an end of the slot; or if the CORESET does not start from a first symbol of one normal slot, allocating, for non-slot-based scheduling, that PDSCH starts from a first available symbol immediately after the CORESET.

At an optional block 1720, the method may further comprise transmitting data in the downlink shared channel. The data may comprise System Information Block (SIB), paging data, or user data. The SIB may comprise SIB1 which contains information required for initial access and other SIBs such as one or more of SIB2-SIB9, as mentioned above.

In an embodiment, the CORESET may be configured by Physical Broadcast Channel (PBCH).

In an embodiment, the downlink shared channel may be scheduled by a Physical Downlink Control Channel (PDCCH) with Cyclic Redundancy Check (CRC) code scrambled by System Information Radio Network Temporary Identity (SI-RNTI). The PDCCH may be transmitted by the network node in a Type® common search space.

Figure 18:
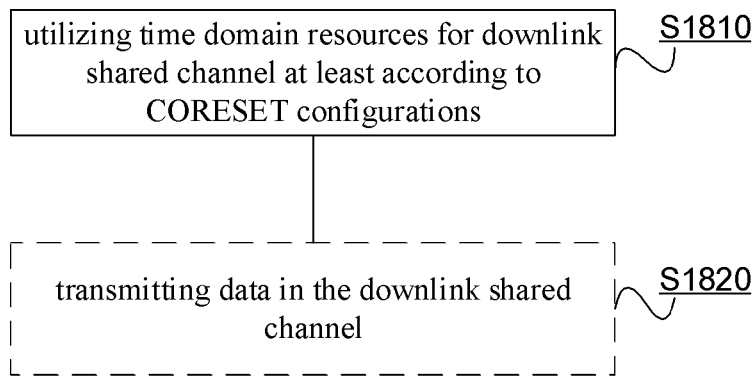
FIG. 18 is a flowchart illustrating a method in a network node according to an embodiment of the disclosure.

FIG. 18 is a flowchart illustrating a method in a network node according to an embodiment of the disclosure.

At block 1810, time domain resources for downlink shared channel are utilized at least according to Control Resource Set (CORESET) configurations. The CORESET configuration is determined by a CORESET position and the CORESET position is configured by Physical Broadcast Channel (PBCH). The time domain resources for downlink shared channel utilized by the network node may be those allocated as have been described with reference to FIG. 17.

At an optional block 1820, the method may further comprise transmitting data in the downlink shared channel. The data may comprise System Information Block (SIB), paging data, or user data. The SIB may comprise SIB1 which contains information required for initial access and other SIBs such as one or more of SIB2-SIB9, as mentioned above.

Figures 19, 20:
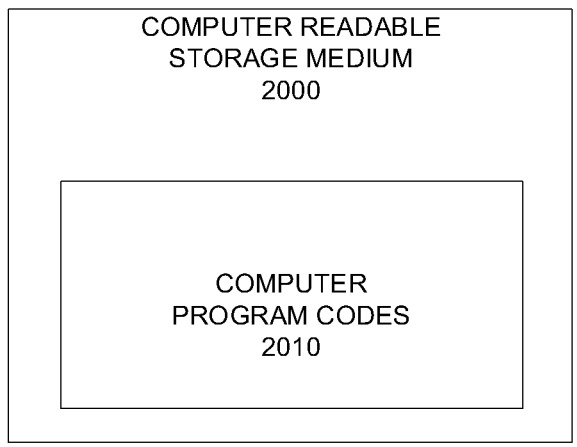
FIG. 19 is a flowchart illustrating a method in a network node according to an embodiment of the disclosure.
FIG. 20 is a block diagram of a computer readable storage medium having stored thereon a computer program comprising computer program code means according to an embodiment of the disclosure.
Figure 21:
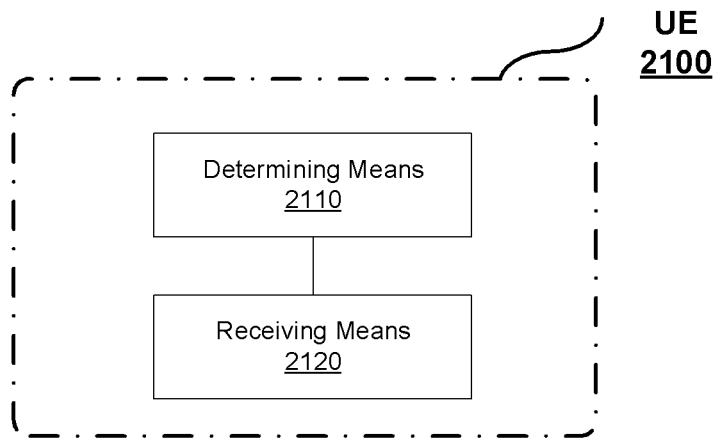
FIG. 21 is a block diagram of an apparatus in a User Equipment according to an embodiment of the disclosure.
Figure 22:
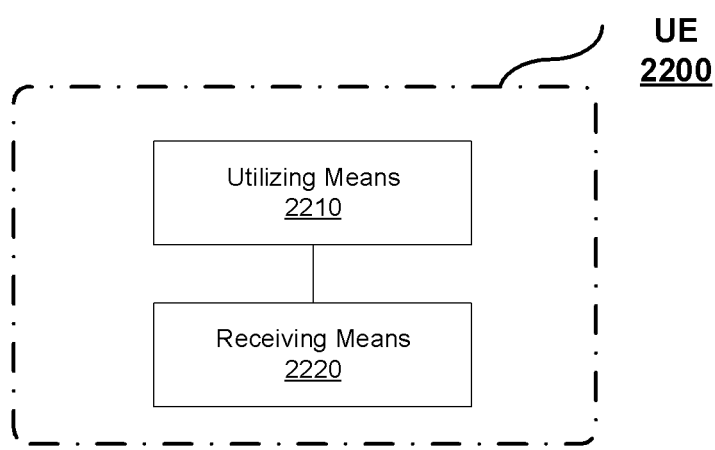
FIG. 22 is a block diagram of an apparatus in a User Equipment according to an embodiment of the disclosure.
Figure 23:
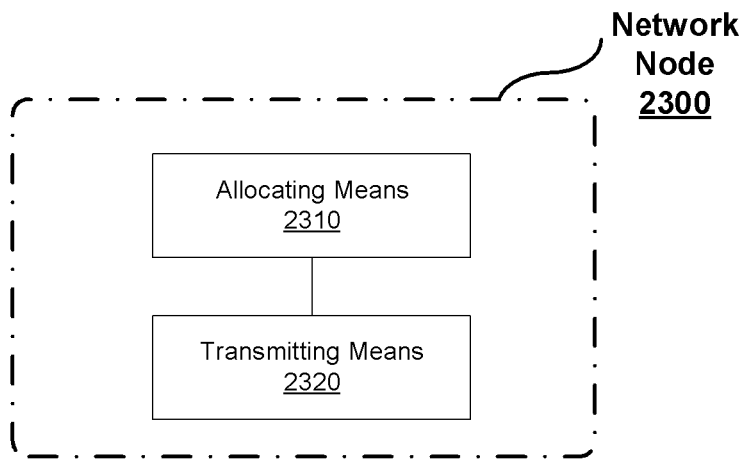
FIG. 23 is a block diagram of an apparatus in a network node according to an embodiment of the disclosure.
Figure 24:
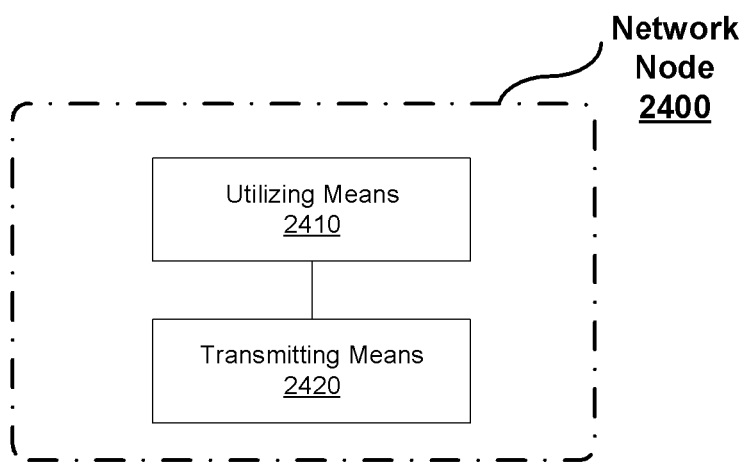
FIG. 24 is a block diagram of an apparatus in a network node according to an embodiment of the disclosure.
Figure 25:
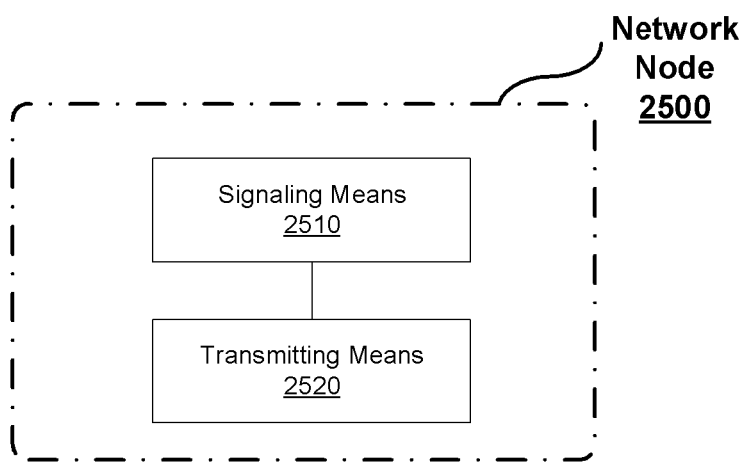
FIG. 25 is a block diagram of an apparatus in a network node according to an embodiment of the disclosure.

FIG. 19 is a flowchart illustrating a method in a network node according to an embodiment of the disclosure.

At block 1910, time domain resources allocation for Physical Downlink Shared Channel (PDSCH) are signaled according to Remaining Minimum System Information (RMSI) Control Resource Set (CORESET) configurations.

In an embodiment, a SS/PBCH block may have a first symbol and a last symbol. The time domain resources for downlink shared channel can be signaled as follows:

signaling that PDSCH starts from the first symbol of the SS/PBCH block and ends with the last symbol of the SS/PBCH block, when the SS/PBCH block and Remaining Minimum System Information (RMSI) CORESET are multiplexed with Type 2 pattern;

signaling that PDSCH starts immediately after a last symbol of Remaining Minimum System Information (RMSI) CORESET and ends with the last symbol of the SS/PBCH block, when the SS/PBCH block and the RMSI CORESET are multiplexed with Type 3 pattern;

when the SS/PBCH block and the RMSI CORESET are multiplexed with Type 1 pattern, if the CORESET starts from a first symbol of one normal slot, signaling, for non-slot-based scheduling, that PDSCH starts immediately after the CORESET and signaling, for slot-based scheduling, that PDSCH starts immediately after the CORESET till an end of the slot; or if the CORESET does not start from a first symbol of one normal slot, signaling, for non-slot-based scheduling, that PDSCH starts from a first available symbol immediately after the CORESET.

In an embodiment, the downlink shared channel may be scheduled by a Physical Downlink Control Channel (PDCCH) with Cyclic Redundancy Check (CRC) code scrambled by System Information Radio Network Temporary Identity (SI-RNTI). The PDCCH may be transmitted by the network node in a Type0 common search space.

The embodiments of the disclosure can be implemented in computer program products. This arrangement of the disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules.

FIG. 20 is a block diagram of a computer readable storage medium having stored thereon a computer program comprising computer program code means according to an embodiment of the disclosure. As shown in FIG. 20, a computer readable medium 2000 has stored thereon computer program codes 2010 for performing, when executed by at least one processor, the methods according to the disclosure as mentioned above. The computer readable medium 2000 may have the form of a non-volatile or volatile memory, e.g., an Electrically Erasable Programmable Read-Only Memory (EEPROM), a flash memory, a floppy disk, and a hard drive, etc. The computer program codes 2010 may include codes/computer readable instructions in any format.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
CORESET Control Resource Set
DCI Downlink Control Information
DMRS Demodulation Reference Signal
FDM Frequency Division Multiplexing
MIB Master Information Block
NR New Radio
OFDM Orthogonal Frequency Division Multiplexing
OS OFDM Symbol
PBCH Physical Broadcast Channel
PDCCH Physical Downlink Control Channel
PDSCH Physical Downlink Shared Channel
RMSI Remaining Minimum System Information
RV Redundancy Version
SCS Subcarrier Spacing
SSB Synchronization Signal Block, also known as SS/PBCH block
SS/PBCH Synchronization Signal and PBCH (including DMRS of PBCH)

The invention claimed is:

1. A method implemented at a User Equipment (UE), the method comprising:
   determining time domain resources for a Physical Downlink Shared Channel (PDSCH) at least according to Control Resource Set (CORESET) configurations prior to RRC connection and without DCI signaling, wherein Synchronization Signal and Physical Broadcast Channel (SS/PBCH) block has a first symbol and a last symbol, and wherein the determining comprises determining that PDSCH is defined to start from the first symbol of the SS/PBCH block and ends with the last symbol of the SS/PBCH block, responsive to determining that the SS/PBCH block and Remaining Minimum System Information (RMSI) CORESET are multiplexed with Type 2 pattern; and
receiving data based on the determined time domain resources.

2. The method of claim 1, further comprising receiving the data in the PDSCH.

3. The method of claim 2, wherein the data comprises System Information Block (SIB), paging data, or user data.

4. The method of claim 3, wherein the SIB comprises SIB1 which contains information required for initial access.

5. The method of claim 1, wherein the CORESET is configured by Physical Broadcast Channel (PBCH).

6. The method of claim 1, wherein the PDSCH is scheduled by a Physical Downlink Control Channel (PDCCH) with Cyclic Redundancy Check (CRC) code scrambled by System Information Radio Network Temporary Identity (SI-RNTI), and wherein the PDCCH is monitored in a Type® common search space.

7. A method implemented at a network node, the method comprising:
allocating time domain resources for a Physical Downlink Shared Channel (PDSCH) at least according to Control Resource Set (CORESET) configurations prior to RRC connection and without DCI signaling, wherein Synchronization Signal and Physical Broadcast Channel (SS/PBCH) block has a first symbol and a last symbol, and wherein the allocating comprises allocating that PDSCH is defined to start from the first symbol of the SS/PBCH block and ends with the last symbol of the SS/PBCH block, in response to the SS/PBCH block and Remaining Minimum System Information (RMSI) CORESET being multiplexed with Type 2 pattern; and
transmitting data based on the allocated time domain resources.

8. The method of claim 7, further comprising transmitting the data in the PDSCH.

9. The method of claim 8, wherein the data comprises System Information Block (SIB), paging data, or user data.

10. The method of claim 9, wherein the SIB comprises SIB1 which contains information required for initial access.

11. The method of claim 7, wherein the CORESET is configured by Physical Broadcast Channel (PBCH).

12. The method of claim 7, wherein the PDSCH is scheduled by a Physical Downlink Control Channel (PDCCH) with Cyclic Redundancy Check (CRC) code scrambled by System Information Radio Network Temporary Identity (SI-RNTI), and wherein the PDCCH is transmitted in a Type0 common search space.

13. An apparatus implemented in a User Equipment (UE), comprising:
one or more processors; and
one or more memories comprising computer program codes, wherein the computer program codes which, when executed by the one or more processors, cause the apparatus to:
determine time domain resources for a Physical Downlink Shared Channel (PDSCH) at least according to Control Resource Set (CORESET) configurations prior to RRC connection and without DCI signaling, wherein Synchronization Signal and Physical Broadcast Channel (SS/PBCH) block has a first symbol and a last symbol, and wherein the determining comprises determining that PDSCH is defined to start from the first symbol of the SS/PBCH block and ends with the last symbol of the SS/PBCH block, responsive to determining that the SS/PBCH block and Remaining Minimum System Information (RMSI) CORESET are multiplexed with Type 2 pattern; and
receive data based on the determined time domain resources.

14. The apparatus of claim 13 further to receive the data in the PDSCH.

15. The apparatus of claim 14, wherein the data comprises System Information Block (SIB), paging data, or user data.

16. The apparatus of claim 15, wherein the SIB comprises SIB1 which contains information required for initial access.

17. The apparatus of claim 13, wherein the CORESET is configured by Physical Broadcast Channel (PBCH).

18. The apparatus of claim 13, wherein the PDSCH is scheduled by a Physical Downlink Control Channel (PDCCH) with Cyclic Redundancy Check (CRC) code scrambled by System Information Radio Network Temporary Identity (SI-RNTI), and wherein the PDCCH is monitored in a Type0 common search space.

\* \* \* \* \*